US012286202B2

(12) United States Patent
Senoo et al.

(10) Patent No.: US 12,286,202 B2
(45) Date of Patent: Apr. 29, 2025

(54) FLUID MACHINE AND UNDERWATER VEHICLE

(71) Applicant: MITSUBISHI HEAVY INDUSTRIES, LTD., Tokyo (JP)

(72) Inventors: Shigeki Senoo, Tokyo (JP); Shinichi Isobe, Tokyo (JP); Wataru Yamada, Tokyo (JP); Takehiko Nishida, Tokyo (JP); Takuyoshi Yamada, Tokyo (JP); Kazuki Hosono, Tokyo (JP); Yoshitomo Noda, Tokyo (JP); Hiroki Takeda, Tokyo (JP); Yuichi Sekine, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 469 days.

(21) Appl. No.: 17/703,093

(22) Filed: Mar. 24, 2022

(65) Prior Publication Data

US 2022/0315185 A1    Oct. 6, 2022

(30) Foreign Application Priority Data

Mar. 31, 2021   (JP) ................. 2021-061810

(51) Int. Cl.
*B63H 1/28*     (2006.01)
*B63G 8/08*     (2006.01)
(Continued)

(52) U.S. Cl.
CPC ............... *B63H 1/28* (2013.01); *B63G 8/08* (2013.01); *B63H 21/17* (2013.01); *F04D 13/06* (2013.01);
(Continued)

(58) Field of Classification Search
CPC . B63H 1/00; B63H 1/28; B63H 21/00; B63H 21/17; B63G 8/00; B63G 8/08;
(Continued)

(56) References Cited

U.S. PATENT DOCUMENTS

| 3,531,214 A | 9/1970 | Abramson |
| 5,286,116 A | 2/1994 | Garis, Jr. |

(Continued)

FOREIGN PATENT DOCUMENTS

| CN | 211370815 | 8/2020 |
| CN | 112061357 | 12/2020 |

(Continued)

OTHER PUBLICATIONS

Renilson, Martin; "Submarine Hydrodynamics", Springer International Publishing; 2015, pp. 120-126, ISSN 2191-5318.

(Continued)

*Primary Examiner* — Lars A Olson
(74) *Attorney, Agent, or Firm* — Wenderoth, Lind & Ponack, L.L.P.

(57) ABSTRACT

A fluid machine includes: a shaft portion extending in an axis direction; a shroud provided to surround the shaft portion and having a diameter decreasing from an upstream side on one side in the axis direction toward a downstream side on another side in the axis direction, a flow path being formed between the shroud and the shaft portion and having a flow path cross-sectional area decreasing toward the downstream side; a propeller rotatably provided about an axis between the shaft portion and the shroud and configured to pump a fluid from the upstream side toward the downstream side; and a motor provided to correspond to the propeller, the motor including a rotor having a ring-like shape and being fixed to an outer circumference portion of the propeller and accommodated in the shroud and a stator (Continued)

having a ring-like shape surrounding the rotor and being fixed in the shroud, in which the motor is a conical motor in which diameters of the rotor and the stator decrease from the upstream side toward the downstream side.

16 Claims, 13 Drawing Sheets

(51) Int. Cl.
  *B63H 21/17* (2006.01)
  *F04D 13/06* (2006.01)
  *H02K 1/30* (2006.01)
  *H02K 5/132* (2006.01)
  *H02K 21/14* (2006.01)
(52) U.S. Cl.
  CPC .............. *H02K 1/30* (2013.01); *H02K 5/132* (2013.01); *H02K 21/14* (2013.01); *H02K 2205/03* (2013.01)
(58) Field of Classification Search
  CPC .......... F04D 13/06; H02K 1/30; H02K 5/132; H02K 21/14; H02K 2205/03
  USPC ......................................................... 114/338
  See application file for complete search history.

(56) References Cited

U.S. PATENT DOCUMENTS

| | | | |
|---|---|---|---|
| 5,289,068 A * | 2/1994 | Veronesi | B63G 8/08 440/38 |
| 5,607,329 A | 3/1997 | Cho et al. | |
| 5,795,076 A | 8/1998 | Ball et al. | |
| 7,353,768 B1 | 4/2008 | Jones et al. | |
| 8,074,592 B2 | 12/2011 | Schröder | |
| 10,202,178 B2 | 2/2019 | Himmelmann | |
| 10,414,477 B2 | 9/2019 | Himmelmann | |
| 10,738,697 B2 | 8/2020 | Himmelmann | |
| 11,152,555 B2 | 10/2021 | Hiller | |
| 12,030,603 B2 | 7/2024 | Lautrup et al. | |
| 2009/0293795 A1 | 12/2009 | Schroder | |
| 2013/0115833 A1 | 5/2013 | Suzuki et al. | |
| 2014/0356199 A1 | 12/2014 | Varis et al. | |
| 2014/0368074 A1 | 12/2014 | Tangudi | |
| 2017/0002857 A1 | 1/2017 | Guest, Jr. | |
| 2017/0104385 A1 | 4/2017 | Salamon et al. | |

FOREIGN PATENT DOCUMENTS

| | | |
|---|---|---|
| CN | 112874746 | 6/2021 |
| CN | 114056529 | 2/2022 |
| EP | 0425723 | 5/1991 |
| EP | 0566788 | 10/1993 |
| FR | 2 927 605 | 8/2009 |
| GB | 2593022 | 9/2021 |
| JP | 5-310185 | 11/1993 |
| JP | 5-310186 | 11/1993 |
| JP | 08-068599 | 3/1996 |
| JP | 10-257730 | 9/1998 |
| JP | 3346589 | 11/2002 |
| JP | 2004-168222 | 6/2004 |
| JP | 2013-100013 | 5/2013 |
| JP | 2017-109726 | 6/2017 |
| JP | 2018-519487 | 7/2018 |
| KR | 200477242 Y1 | 5/2015 |
| WO | 2004/113717 | 12/2004 |

OTHER PUBLICATIONS

U.S. Office Action issued Oct. 26, 2022 in U.S. Appl. No. 17/825,451.
U.S. Office Action issued Sep. 16, 2024 in U.S. Appl. No. 17/702,106.
U.S. Office Action issued Oct. 28, 2024 in U.S. Appl. No. 17/700,724.

* cited by examiner

FLUID MACHINE AND UNDERWATER VEHICLE

CROSS-REFERENCE TO RELATED APPLICATIONS

This application claims the benefit of priority to Japanese Patent Application Number 2021-061810 filed on Mar. 31, 2021. The entire contents of the above-identified application are hereby incorporated by reference.

TECHNICAL FIELD

The present disclosure relates to a fluid machine and an underwater vehicle.

RELATED ART

For example, an outer periphery driving propulsion apparatus is described in U.S. Pat. No. 8,074,592 as an example of a fluid machine. The propulsion apparatus includes a shroud having a tubular shape formed around the axis, and propellers coaxially arranged on the inner side of the shroud.

In the shroud, motors are accommodated. Each motor includes a rotor provided on an outer circumference portion of the propeller and a stator surrounding the rotor from the outer circumference side. The motor and stator each have a tubular shape with the outside surface and the inside surface being parallel with the axis.

Such motors implement outer periphery driving of the propellers, to make a fluid pumped in the axis direction inside the shroud.

SUMMARY

When a fluid is pumped by the propellers, the flow rate of the fluid increases, resulting in the flow of the fluid narrowed toward the inner side in the radial direction. In view of this, a flow path in which such a fluid flows preferably has a shape accordingly narrowed toward the downstream side, that is, the flow path has a flow path cross-sectional area decreasing toward the downstream side. However, the above-described propulsion apparatus described in U.S. Pat. No. 8,074,592 is configured to have the flow path cross-sectional area on the inner side of the shroud increasing toward the downstream side. Thus, the configuration is not preferable in terms of propeller efficiency.

On the other hand, to implement the outer periphery driving, it is necessary to dispose the motors in the shroud, and thus the space is required to be provided in the shroud so that the motors can be accommodated. However, the upsizing of the shroud, forming the outer shape of the propulsion apparatus, leads to an increase in the overall volume of the propulsion apparatus, and thus is not preferable.

The present disclosure is made to solve the problems described above, and an object of the present disclosure is to provide a fluid machine and an underwater vehicle that can be made compact with which improvement in efficiency as well can be achieved.

In order to solve the problems described above, a fluid machine according to the present disclosure includes: a shaft portion extending in an axis direction; a shroud provided to surround the shaft portion and having a diameter decreasing from an upstream side on one side in the axis direction toward a downstream side on another side in the axis direction, a flow path being formed between the shroud and the shaft portion and having a flow path cross-sectional area decreasing toward the downstream side; a propeller rotatably provided about an axis between the shaft portion and the shroud and configured to pump a fluid from the upstream side toward the downstream side; and a motor provided to correspond to the propeller, the motor including a rotor having a ring-like shape and being fixed to an outer circumference portion of the propeller and accommodated in the shroud and a stator having a ring-like shape surrounding the rotor and being fixed in the shroud, in which the motor is a conical motor in which diameters of the rotor and the stator decrease from the upstream side toward the downstream side.

The present disclosure can provide a fluid machine and an underwater vehicle that can be made compact with which improvement in efficiency as well can be achieved.

BRIEF DESCRIPTION OF DRAWINGS

The disclosure will be described with reference to the accompanying drawings, wherein like numbers reference like elements.

DESCRIPTION OF EMBODIMENTS

<Overall Configuration of Underwater Vehicle>

Figure 1:
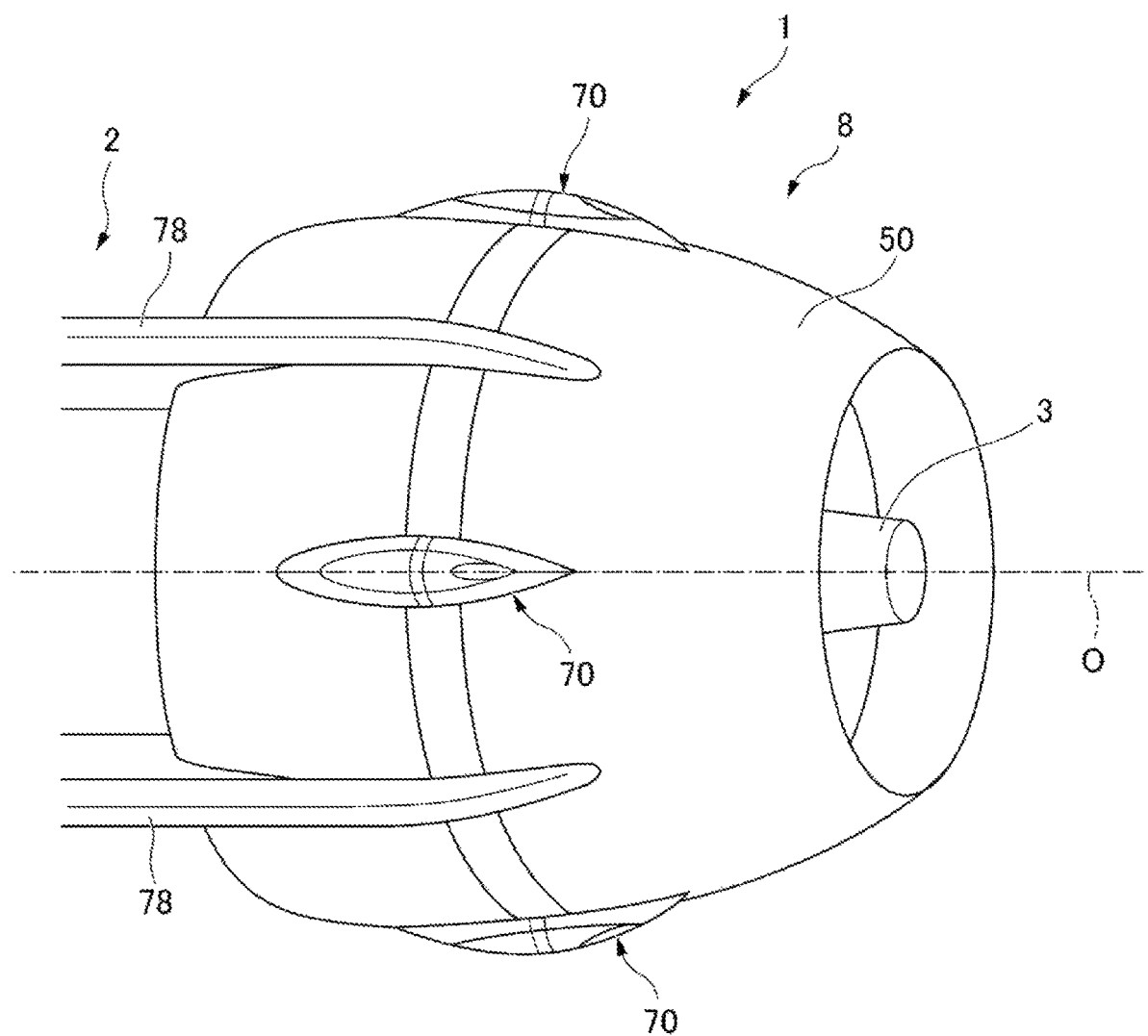
FIG. 1 is a perspective view of the stern of an underwater vehicle according to an embodiment of the present disclosure.
Figure 2:
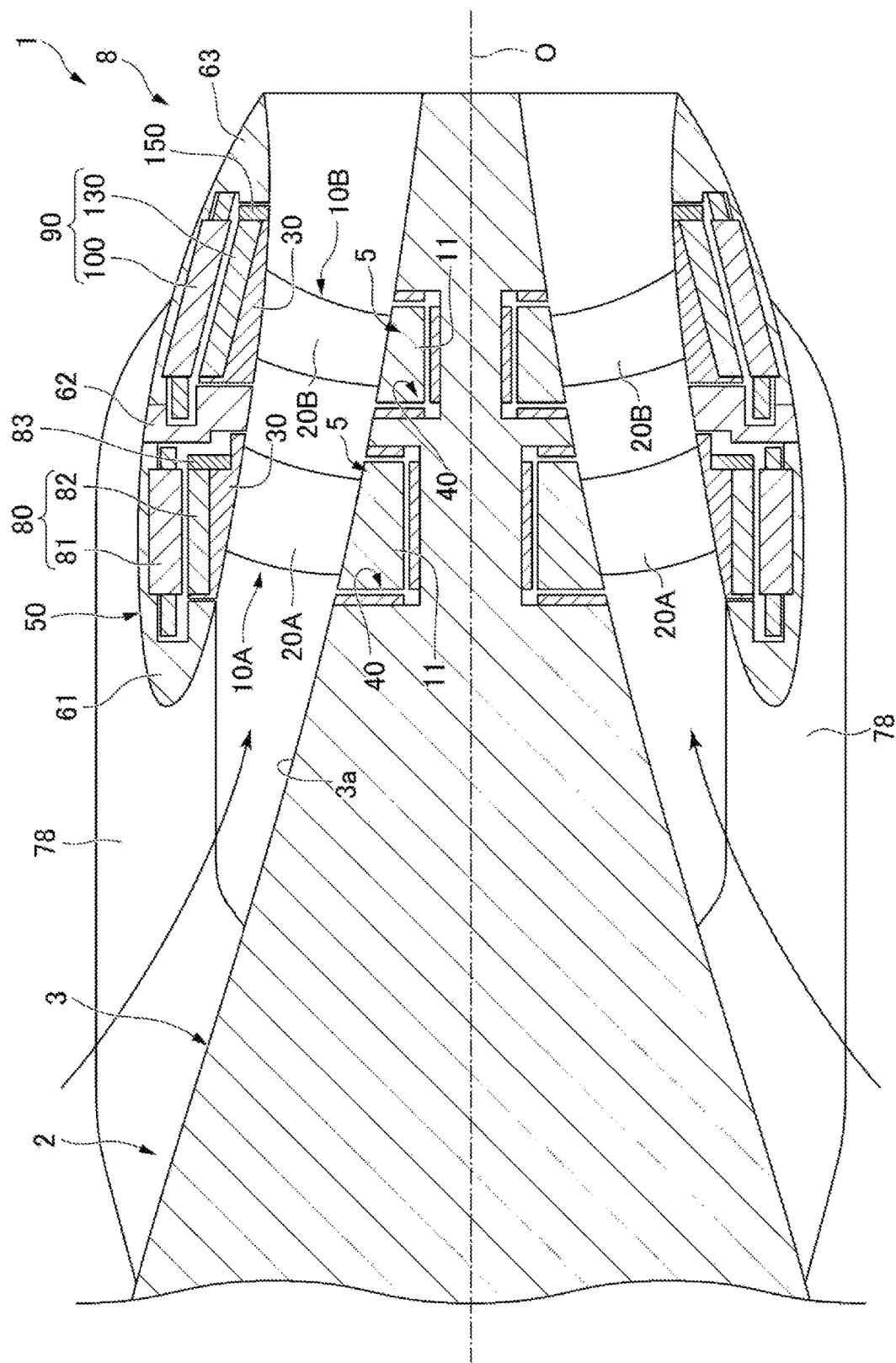
FIG. 2 is a vertical cross-sectional view of a propulsion apparatus according to the embodiment of the present disclosure.

The following describes in detail embodiments of the disclosure, with reference to the drawings. As illustrated in FIG. 1 and FIG. 2, an underwater vehicle 1 includes a vehicle body 2 and a propulsion apparatus 8.

<Vehicle Body>

The vehicle body 2 is formed by a pressure-resistant container that extends along an axis O. The vehicle body 2 accommodates various devices, power supply, communication equipment, sensors, and the like required for cruising underwater, for example.

<Propulsion Apparatus>

In a rear portion of the vehicle body 2, the propulsion apparatus 8 is provided integrally with the vehicle body 2. The propulsion apparatus 8 is an apparatus for propelling the underwater vehicle 1 underwater.

The propulsion apparatus 8 includes a shaft portion 3, a first propeller 10A, a second propeller 10B, bearing portions 40, a shroud 50, coupling portions 70, struts 78, a tubular motor 80, and a conical motor 90.

<Shaft Portion>

As illustrated in FIG. 2, the shaft portion 3 is integrally provided in the rear portion of the vehicle body 2. The shaft portion 3 may be part of the vehicle body 2. The shaft portion 3 has a rod shape extending along the axis O. The shaft portion 3 of the present embodiment has a truncated cone shape having a diameter decreasing from one side in the axis O direction (front side of the vehicle body 2) toward the other side in the axis O direction (rear side of the vehicle body 2). A surface of the shaft portion 3 facing an outer side in a radial direction is a shaft outside surface 3a forming a tapered shape having a diameter decreasing toward the other side in the axis O direction.

Receiving grooves 5 formed on the shaft portion 3 are recessed to an inner side in the radial direction from the shaft outside surface 3a, and annularly extend in a circumferential direction. Two receiving grooves 5 are formed at an interval in the axis O direction.

Figure 3:
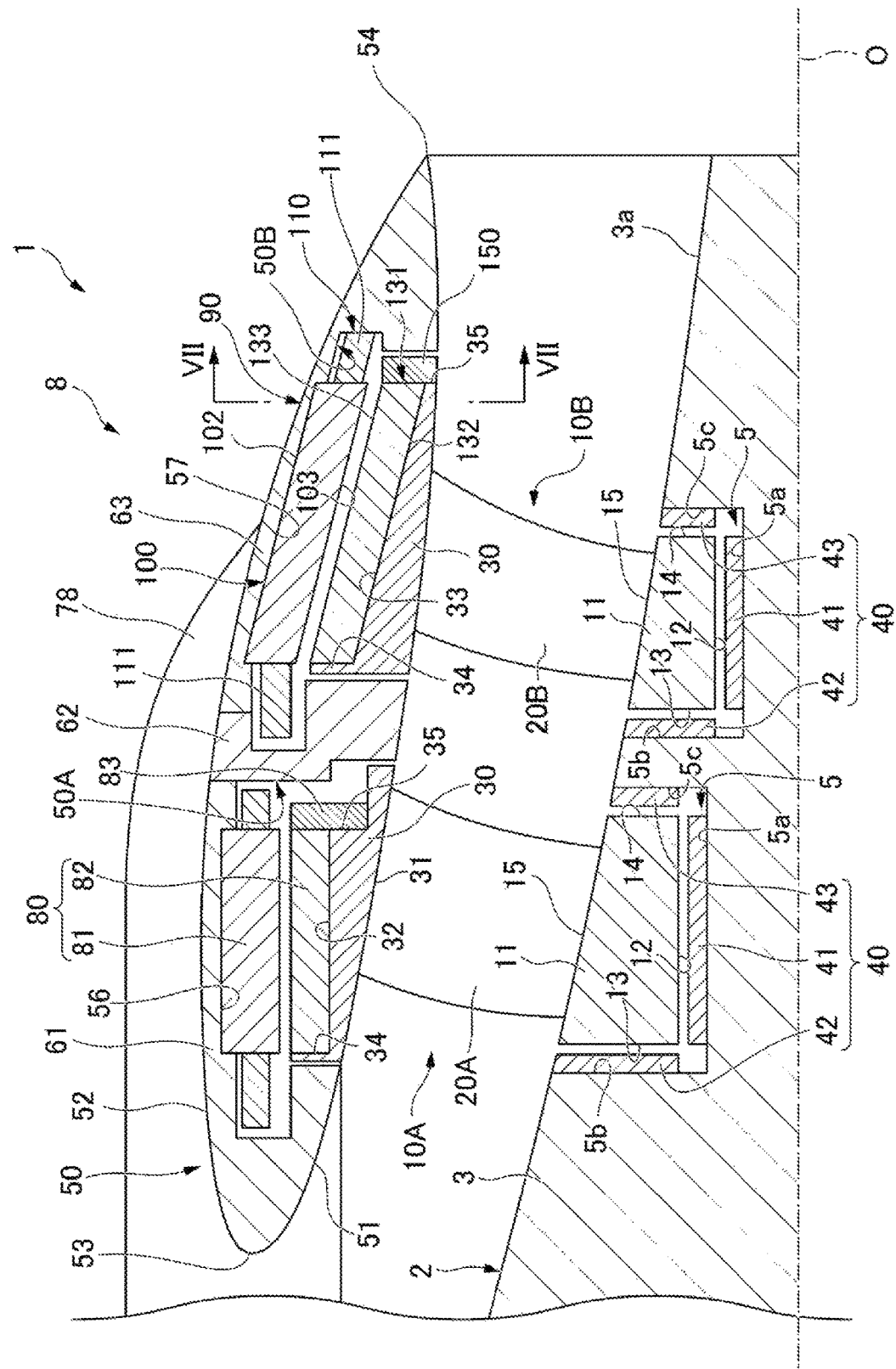
FIG. 3 is an enlarged view of a main part in FIG. 2.

Specifically, as illustrated in FIG. 3, a surface facing the outer side in the radial direction at the bottom of each receiving groove 5 is a groove bottom surface 5a. The groove bottom surface 5a forms a cylindrical shape around the axis O.

A surface, forming the receiving groove 5, on the one side in the axis O direction is a groove upstream side surface 5b. The groove upstream side surface 5b has a planar shape orthogonal to the axis O, and faces the other side in the axis O direction. The groove upstream side surface 5b annularly extends around the axis O.

A surface, forming the receiving groove 5, on the other side in the axis O direction is a groove downstream side surface 5c. The groove downstream side surface 5c has a planar shape orthogonal to the axis O, and faces the one side in the axis O direction. The groove downstream side surface 5c annularly extends around the axis O. The groove downstream side surface 5c is parallel to the groove upstream side surface 5b.

<First Propeller and Second Propeller>

As illustrated in FIG. 2 and FIG. 3, the first propeller 10A and the second propeller 10B are arranged on an outer circumference side of the shaft portion 3, and are relatively rotatable, about the axis O, with respect to the shaft portion 3. The first propeller 10A includes an inner circumference ring 11, a first blade 20A, and an outer circumference ring 30. The second propeller 10B includes an inner circumference ring 11, a second blade 20B, and an outer circumference ring 30.

<Inner Circumference Ring>

The inner circumference ring 11 is a member having a ring-like shape around the axis O. The inner circumference ring 11 of the first propeller 10A is received in the receiving groove 5 on the one side in the axis O direction. The inner circumference ring 11 of the second propeller 10B is received in the receiving groove 5 on the other side in the axis O direction.

As illustrated in FIG. 3, the inner circumference ring 11 includes a ring inner surface 12, an upstream end surface 13, a downstream end surface 14, and an outer circumference flow path surface 15.

The ring inner surface 12 forms an inside surface of the inner circumference ring 11. The ring inner surface 12 forms a cylindrical shape facing the groove bottom surface 5a entirely over the circumferential direction. The inside diameter of the ring inner surface 12 is set to be greater than the outside diameter of the groove bottom surface 5a.

The upstream end surface 13 is a surface of the inner circumference ring 11 facing the one side in the axis O direction, and is disposed on the other side of the groove upstream side surface 5b in the axis O direction with a space in between.

The downstream end surface 14 is a surface of the inner circumference ring 11 facing the other side in the axis O direction, and is disposed on the one side of the groove downstream side surface 5c in the axis O direction with a space in between.

The outer circumference flow path surface 15 forms an outside surface of the inner circumference ring 11 facing the outer side in the radial direction. The outer circumference flow path surface 15 forms a tapered shape with a diameter decreasing toward the other side in the axis O direction. The outer circumference flow path surface 15 extends to be continuous with the shaft outside surface 3a.

<First Blade 20A and Second Blade 20B>

The first blade 20A is provided to extend to the outer side in the radial direction from the outer circumference flow path surface 15 of the inner circumference ring 11 of the first propeller 10A. The second blade 20B is provided to extend to the outer side in the radial direction from the outer circumference flow path surface 15 of the inner circumference ring 11 of the second propeller 10B. A plurality of the first blades 20A and the second blades 20B are provided at an interval in the circumferential direction. The dimension of the first blade 20A and the second blade 20B in the axis O direction is smaller than the dimension of the inner circumference ring 11 in the axis O direction.

The cross-sectional shapes of the first blade 20A and the second blade 20B intersecting in the radial direction are of a blade form. Edge portions of the first blade 20A and the second blade 20B on the one side in the axis O direction are leading edges on an upstream side. Edge portions of the first blade 20A and the second blade 20B on the other side in the axis O direction are trailing edges on a downstream side. The one side and the other side in the axis O direction will be hereinafter respectively simply referred to as "upstream side" and "downstream side".

Figure 4A:
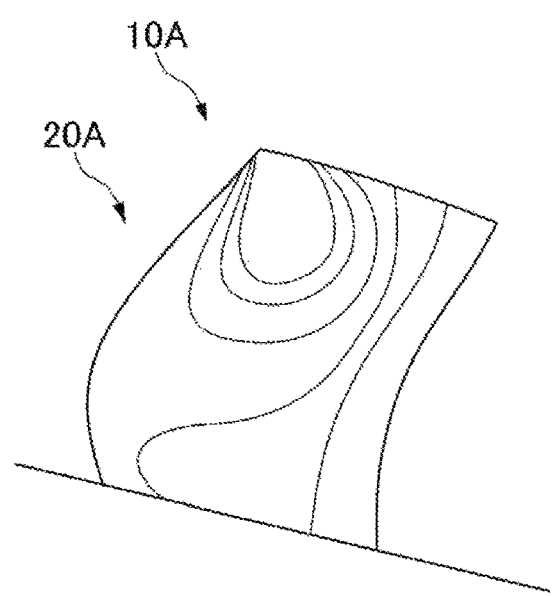
FIGS. 4A and 4B illustrate suction side pressure distributions of blades in propellers of the propulsion apparatus according to the embodiment, FIG. 4A being a drawing illustrating a suction side pressure distribution of a first blade, FIG. 4B being a drawing illustrating a suction side pressure distribution of a second blade.
Figure 4B:
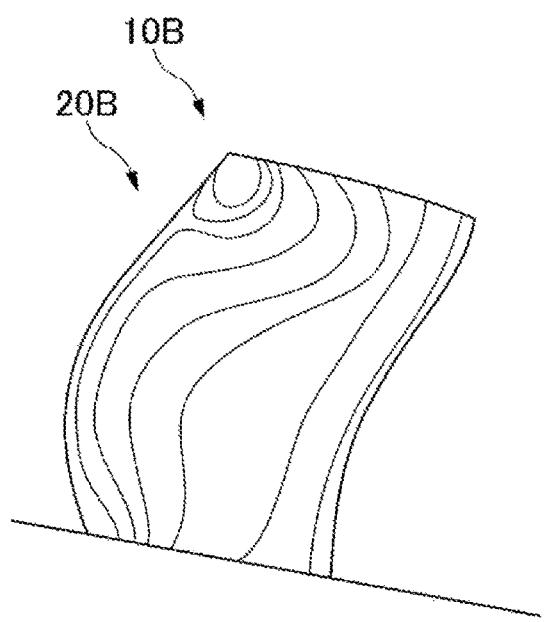

Now, the structure of the first blade 20A and the second blade 20B will be described in detail with reference to FIGS. 4A and 4B. FIGS. 4A and 4B illustrate pressure distributions on a suction side in a case where the first blade 20a and the second blade 20b rotate at a predetermined speed.

As illustrated in FIG. 4A, in the pressure distribution on the suction side of the first blade 20a, a region with the highest pressure, that is, a region with the largest load is formed on the leading edge side and the outer side in the radial direction. A portion on the inner side in the radial direction has no large load portion, and thus the load is low entirely over the portion in the axis O direction.

As illustrated in FIG. 4B, in the pressure distribution on the suction side of the second blade 20B, a region with the largest load is formed over the entirety of the leading edge in the radial direction. In particular, a portion on the leading edge side and on the outer side in the radial direction includes a locally large load portion.

As described above, the suction side pressure distribution of the second blade 20B is of a leading edge load type with the load concentrated on the leading edge. On the other hand, the suction side pressure distribution of the first blade 20A is of a balanced load type, with the load more distributed in the axis O direction, than in the suction side pressure distribution of the second blade 20B, with the load being smaller on the inner side in the radial direction.

<Outer Circumference Ring>

As illustrated in FIG. 2 and FIG. 3, the outer circumference ring 30 is a member forming an outer circumference portion of the first propeller 10A and the second propeller 10B, and has a ring-like shape around the axis O. The outer circumference ring 30 of the first propeller 10A establishes circumferential direction connection between the plurality of first blades 20A arranged in the circumferential direction. The outer circumference ring 30 of the second propeller 10B establishes circumferential direction connection between the plurality of second blades 20B arranged in the circumferential direction. The dimension of the outer circumference ring 30 of the first propeller 10A in the axis O direction is larger than the dimension of the first blade 20A in the axis O direction. The dimension of the outer circumference ring 30 of the second propeller 10B in the axis O direction is larger than the dimension of the second blade 20B in the axis O direction.

The outer circumference ring 30 of the first propeller 10A includes an inner circumference flow path surface 31, a cylindrical fix surface 32, a holding portion 34, and a downstream end surface 35. The outer circumference ring 30 of the second propeller 10B includes an inner circumference flow path surface 31, a tapered fix surface 33, a holding portion 34, and a downstream end surface 35.

The inner circumference flow path surface 31 is a surface forming the inside surface of each outer circumference ring 30. The inner circumference flow path surface 31 of the outer circumference ring 30 of the first propeller 10A is integrally connected to end portions of the plurality of first blade 20A arranged in the circumferential direction, on the outer side in the radial direction. The inner circumference flow path surface 31 of the outer circumference ring 30 of the second propeller 10B is integrally connected to end portions of the plurality of second blade 20B arranged in the circumferential direction, on the outer side in the radial direction.

The cylindrical fix surface 32 is a surface forming the outside surface of the outer circumference ring 30 of the first propeller 10A. The cylindrical fix surface 32 forms a cylindrical shape around the axis O, and extends in the axis O direction. The cylindrical fix surface 32 is parallel to the axis O.

The tapered fix surface 33 is a surface forming the outside surface of the outer circumference ring 30 of the second propeller 10B. The tapered fix surface 33 forms a tapered shape with a diameter decreasing toward the downstream side. The tapered fix surface 33 has a uniform taper angle, and thus extends in the axis O direction with a uniform inclination angle relative to the axis O. With such a tapered fix surface 33 provided, the thickness of the outer circumference ring 30 of the second propeller 10B in the radial direction decreases toward the downstream side.

The holding portion 34 protrudes to the outer side in the radial direction from each of the end portion of the cylindrical fix surface 32 on the upstream side and the end portion of the tapered fix surface 33 on the upstream side in each outer circumference ring 30, and entirely extends in the circumferential direction.

<Bearing Portions>

The bearing portions 40 support the first propeller 10A and the second propeller 10B to be rotatable relative to the shaft portion 3. The bearing portions 40 are provided in the respective receiving grooves 5 and rotatably supports the inner circumference rings 11 of the first propeller 10A and the second propeller 10B. The bearing portions 40 each include a radial bearing 41, an upstream side thrust bearing 42, and a downstream side thrust bearing 43.

The radial bearing 41 is provided on the groove bottom surface 5a of the receiving groove 5 entirely over the circumferential direction. In the present embodiment, a journal bearing is used as the radial bearing 41. The outside diameter of the journal bearing is smaller than the inside diameter of the inner circumference ring 11. Thus, a clearance is formed entirely over the circumferential direction between the journal bearing and the inner circumference ring 11.

The upstream side thrust bearing 42 is provided on the groove upstream side surface 5b of the receiving groove 5 entirely over the circumferential direction. The upstream side thrust bearing 42 faces the upstream end surface 13 of the inner circumference ring 11 in the axis O direction, across the clearance.

The downstream side thrust bearing 43 is provided on the groove downstream side surface 5c of the receiving groove 5 entirely over the circumferential direction. The downstream side thrust bearing 43 faces the downstream end surface 35 of the inner circumference ring 11 in the axis O direction, across the clearance.

Water flowing into the receiving groove 5 is provided between the radial bearing 41, the upstream side thrust bearing 42, and the downstream side thrust bearing 43 and the inner circumference ring 11. Thus, the radial bearing 41, the upstream side thrust bearing 42, and the downstream side thrust bearing 43 rotatably support the inner circumference ring 11, with a water film formed between the bearings and the inner circumference ring 11.

<Shroud>

The shroud 50 is provided to surround the shaft portion 3, the first propeller 10A, and the second propeller 10B from the outer circumference side. The shroud 50 forms an annular shape around the axis O. The shroud 50 is disposed with a space from the outside surface of the shaft portion 3 in the radial direction. Thus, an annular flow path is formed entirely over the axis O direction between the shroud 50 and the shaft portion 3. The first blades 20A of the first propeller 10A and the second blades 20B of the second propeller 10B are positioned in the flow path, and the outer circumference rings 30 of the first propeller 10A and the second propeller 10B are accommodated in the shroud 50.

The surface of the shroud 50 facing the inner side in the radial direction is a shroud inside surface 51. The shroud inside surface 51 faces the flow path. The surface of the shroud 50 facing the outer side in the radial direction is a shroud outside surface 52.

The cross-sectional shape of the shroud 50 of the present embodiment, including the axis O, is of a blade form. A connection portion between end portions of the shroud inside surface 51 and the shroud outside surface 52 on the upstream side is a shroud leading edge 53 annularly extending over the circumferential direction. A connection portion at end portions of the shroud inside surface 51 and the shroud outside surface 52 on the downstream side is a shroud trailing edge 54 extending over the circumferential direction and forming an annular shape. The position of the shroud trailing edge 54 in the axis O direction is the same as the position of the rear end of the shaft portion 3 in the axis O direction.

The shroud 50 has a shape with the diameter gradually decreasing toward the downstream side from the upstream side. In the present embodiment, a camber line, in the blade form cross section of the shroud 50, the distances of which from the shroud inside surface 51 and the shroud outside surface 52 are the same, is gradually inclined to the inner side in the radial direction toward the downstream side from the upstream side. Thus, the shroud trailing edge 54 is positioned more on the inner side than the shroud leading edge 53 in the radial direction.

The shroud outside surface 52 has a diameter first increasing toward the downstream side in a portion around the shroud leading edge 53, and then smoothly decreasing toward the downstream side. The shroud outside surface 52 forms a convex curved shape protruding toward the outer side in the radial direction.

The shroud inside surface 51 has a diameter decreasing on the inner side in the radial direction toward the downstream side, entirely over the axis O direction. The shroud inside surface 51 forms a convex curved shape protruding toward the inner side in the radial direction. The annular flow path formed between the shroud inside surface 51 and the shaft outside surface 3a of the shaft portion 3 is narrowed on the inner side in the radial direction toward the downstream side. Thus, the flow path cross-sectional area of the flow path decreases toward the downstream side.

The shroud inside surface 51 does not need to have the diameter decreasing over the entire section from the shroud leading edge 53 to the shroud trailing edge 54. It suffices if the diameter decreases from the shroud leading edge 53 to at least the position of the trailing edge of the second blade 20B of the second propeller 10B in the axis O direction.

Thus, the flow path cross-sectional area of the flow path formed by the shroud inside surface 51 and the shaft outside surface 3a does not need to have the diameter gradually decreasing over the entirety of the shroud 50 in the axis O direction. It suffices if the diameter gradually decreases from the shroud leading edge 53 to at least the position of the trailing edge of the second blade 20B of the second propeller 10B in the axis O direction.

A first cavity 50A and a second cavity 50B that are recessed to the outer side in the radial direction from the shroud inside surface 51 are formed in the shroud 50. The first cavity 50A is formed in a portion on the upstream side in the shroud 50, whereas the second cavity 50B is formed in a portion on the downstream side in the shroud 50. Thus, the second cavity 50B is formed more on the downstream side than the first cavity 50A.

The outer circumference ring 30 of the first propeller 10A is accommodated in the first cavity 50A. The outer circumference ring 30 of the second propeller 10B is accommodated in the second cavity 50B. The inner circumference flow path surface 31 of each outer circumference ring 30 extends to be continuous with the shroud inside surface 51 in the axis O direction. In other words, the inner circumference flow path surface 31 extends to form a part of the convex curved surface of the shroud inside surface 51.

On a surface in the first cavity 50A facing the inner side in the radial direction, a cylindrical fix recess portion 56 having a bottom portion and forming a cylindrical shape around the axis O is formed. The cylindrical fix recess portion 56 is formed at a position in the outer circumference ring 30 of the first propeller 10A, corresponding to the cylindrical fix surface 32 in the axis O direction.

On a surface in the second cavity 50B facing the inner side in the radial direction, a tapered fix recess portion 57 having a bottom portion and having a diameter decreasing toward the downstream side with a uniform taper angle is formed. The tapered fix recess portion 57 is formed at a position in the outer circumference ring 30 of the second propeller 10B, corresponding to the tapered fix surface 33 in the axis O direction.

The shroud 50 of the present embodiment is formed by coupling a plurality of segments, split in the axis O direction. Specifically, the shroud 50 includes, as the segments, an upstream segment 61, an intermediate segment 62, and a downstream segment 63.

The upstream segment 61 forms a portion on the upstream side including the shroud leading edge 53.

The intermediate segment 62 forms a portion continuous to the downstream side of the upstream segment 61 of the shroud 50. The first cavity 50A is defined and formed by the intermediate segment 62 closing, from the downstream side, a largely notched part of the upstream segment 61 on the inner side in the radial direction and on the downstream side.

The downstream segment 63 forms a portion that is continuous to the downstream side of the intermediate segment 62, and forms a portion including the shroud trailing edge 54. The second cavity 50B is defined and formed by intermediate segment 62 closing, from the upstream side, a largely notched part of the downstream segment 63 on the inner side in the radial direction and on the upstream side.

<Coupling Portions>

As illustrated in FIG. 1, the coupling portions 70 are provided to protrude from the shroud outside surface 52 of the shroud 50. The coupling portions 70 couple the plurality of segments of the shroud 50 to each other.

Figure 5:
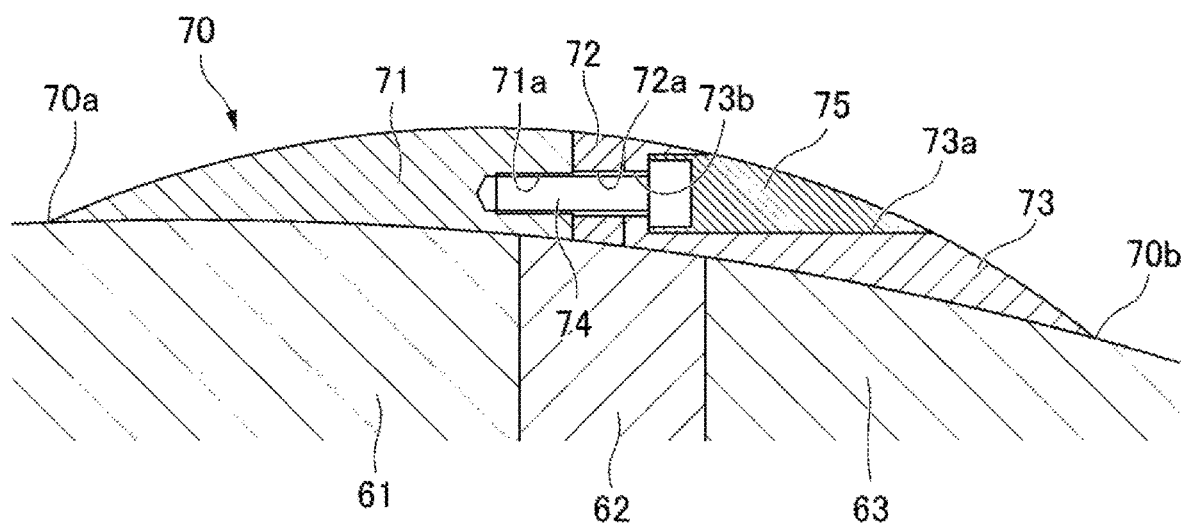
FIG. 5 is a vertical cross-sectional view of a coupling portion disposed on an outside surface of a shroud.

As illustrated in detail in FIG. 5, the coupling portions 70 each include an upstream protruding portion 71, an intermediate protruding portion 72, a downstream protruding portion 73, a coupling bolt 74, and a filling portion 75.

The upstream protruding portion 71 is integrally provided to the upstream segment 61 of the shroud 50, and protrudes from the outside surface of the upstream segment 61. A bolt fix hole 71a is formed, in the upstream protruding portion 71, as a recess from the downstream side toward the upstream side.

The intermediate protruding portion 72 is integrally provided to the intermediate segment 62 of the shroud 50, and protrudes from the outside surface of the intermediate segment 62. A bolt through-hole 72a is formed through the intermediate protruding portion 72 in the axis O direction.

The downstream protruding portion 73 is integrally provided to the downstream segment 63 of the shroud 50, and protrudes from the outside surface of the downstream segment 63. A bolt recess portion 73a is formed in the downstream protruding portion 73 as a recess from the downstream side toward the upstream side. In the bottom portion of the bolt recess portion 73a, a bolt insertion hole 73b is formed that penetrates the bottom portion and the surface of the downstream protruding portion 73 facing the upstream side.

The coupling bolt 74 couples the upstream protruding portion 71, the intermediate protruding portion 72, and the downstream protruding portion 73 to each other. When the upstream segment 61, the intermediate segment 62, and the downstream segment 63 are coupled to each other by the coupling portion 70, the upstream protruding portion 71, the intermediate protruding portion 72, and the downstream protruding portion 73 are positioned in this order from the upstream side to the downstream side, to sequentially come into contact with each other. In this state, the bolt insertion hole 73b, the bolt through-hole 72a, and the bolt fix hole 71a are in communication with each other in the axis O direction. The coupling bolt 74 is inserted and fixed in the bolt insertion hole 73b, the bolt through-hole 72a, and the bolt fix hole 71a thus in communication with each other, via the bolt recess portion 73a. As a result, the upstream protruding portion 71, the intermediate protruding portion 72, and the downstream protruding portion 73 are integrally coupled to each other, and the upstream segment 61, the intermediate segment 62, and the downstream segment 63 respectively integrated with the upstream protruding portion 71, the intermediate protruding portion 72, and the downstream protruding portion 73 are integrally coupled to each other in the axis O direction.

The filling portion 75 is provided to fill the bolt recess portion 73a. The filling portion 75 is cured resin for example. The filling portion 75 is formed when resin in a liquid form is poured into the bolt recess portion 73a after the coupling bolt 74 is attached and the resin is cured. A part of the filling portion 75 forms the outer surface of the coupling portion 70.

Now the outer surface shape of the coupling portion 70 as described above will be described with reference to FIG. 5 and FIG. 6. The outer surface shape of the coupling portion 70 is formed by the upstream protruding portion 71, the intermediate protruding portion 72, and the downstream protruding portion 73, as well as the surface of the filling portion 75 exposed from the bolt recess portion 73a. The coupling portion 70 as a whole forms a convex curved shape protruding from the shroud outside surface 52. The coupling portion 70 forms a convex curved shape with a longitudinal direction matching the axis O direction.

Figure 6:
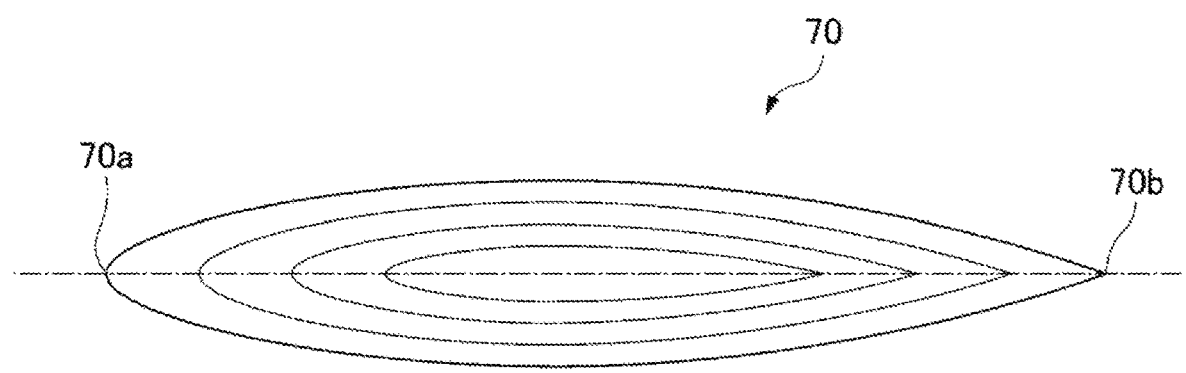
FIG. 6 is a schematic view of the coupling portion disposed on the outside surface of the shroud as viewed from an outer side in a radial direction.

Furthermore, as illustrated in FIG. 6, the coupling portion 70 of the present embodiment has a cross-sectional shape, along the shroud outside surface 52, of a blade form with the upstream side corresponding to the leading edge and the downstream side corresponding to the trailing edge. The leading edge of the coupling portion 70 is a protruding portion leading edge 70a. The trailing edge of the coupling portion 70 is a protruding portion trailing edge 70b. More specifically, the coupling portion 70 has a shape obtained by stacking blade forms in the normal direction with similar shapes and sizes gradually decreasing as they get further in the normal direction of the shroud outside surface 52.

<Struts>

As illustrated in FIG. 1 and FIG. 2, the struts 78 support the shroud 50 with respect to the shaft portion 3, by coupling the shroud 50 and the shaft portion 3 to each other. A plurality of the struts 78 are provided at an interval in the circumferential direction, and extend in the axis O direction. The downstream side end portion of each strut 78 is fixed to the shroud 50. The upstream side end portion of the strut 78 is fixed to the shaft outside surface 3a of the shaft portion 3.

The cross-sectional shape of the strut 78 orthogonal to the axis O is a flat rectangular shape with the longitudinal direction matching the radial direction and the shorter direction matching the circumferential direction. Thus, the rotation of the propulsion of the underwater vehicle 1 is suppressed.

<Tubular Motor>

As illustrated in FIG. 2 and FIG. 3, the tubular motor 80 is accommodated in the first cavity 50A of the shroud 50. The tubular motor 80 rotationally drives the first propeller 10A. The tubular motor 80 includes a tubular stator 81 and a tubular rotor 82.

The tubular stator 81 forms a tubular shape around the axis O, extending in the axis O direction. The inside surface and the outside surface of the tubular stator 81 are parallel to the axis O. The tubular stator 81 has the outside surface fitted to the cylindrical fix recess portion 56 in the first cavity 50A of the shroud 50. Thus, the tubular motor 80 is integrally fixed to the shroud 50.

The tubular rotor 82 forms a tubular shape around the axis O, extending in the axis O direction. The inside surface and the outside surface of the tubular rotor 82 are parallel to the axis O. The outside diameter of the tubular rotor 82 is set to be smaller than the inside diameter of the tubular stator 81. The dimension of the tubular rotor 82 in the axis O direction is the same as that of the tubular stator 81. The tubular rotor 82 is integrally fixed to the cylindrical fix surface 32 of the first propeller 10A from the outer circumference side. The outside surface of the tubular rotor 82 faces the inside surface of the tubular stator 81 entirely over the circumferential direction and the axis O direction. A clearance is formed entirely over the circumferential direction and the axis O direction, between the outside surface of the tubular rotor 82 and the inside surface of the tubular stator 81.

The upstream side end surface of the tubular rotor 82 is in contact with the holding portion 34 in the outer circumference ring 30 of the first propeller 10A, from the downstream side.

A first holding plate 83 is in contact with the downstream side end surface of the tubular rotor 82. The first holding plate 83 is provided over the entirety between the downstream side end surface of the tubular rotor 82 and the downstream end surface 35 of the outer circumference ring 30 of the first propeller 10A. With the first holding plate 83 fixed to the outer circumference ring 30 using a bolt not illustrated, the tubular rotor 82 is fixed by the first holding plate 83 from the downstream side.

In the tubular motor 80, when the tubular stator 81 is energized, a rotating magnetic field is generated, whereby the tubular rotor 82 rotates about the axis O.

<Conical Motor>

As illustrated in FIG. 2 and FIG. 3, the conical motor 90 is accommodated in the second cavity 50B of the shroud 50. The conical motor 90 drives the second propeller 10B. The conical motor 90 includes a conical stator 100 and a conical rotor 130.

<Conical Stator>

Figure 7:
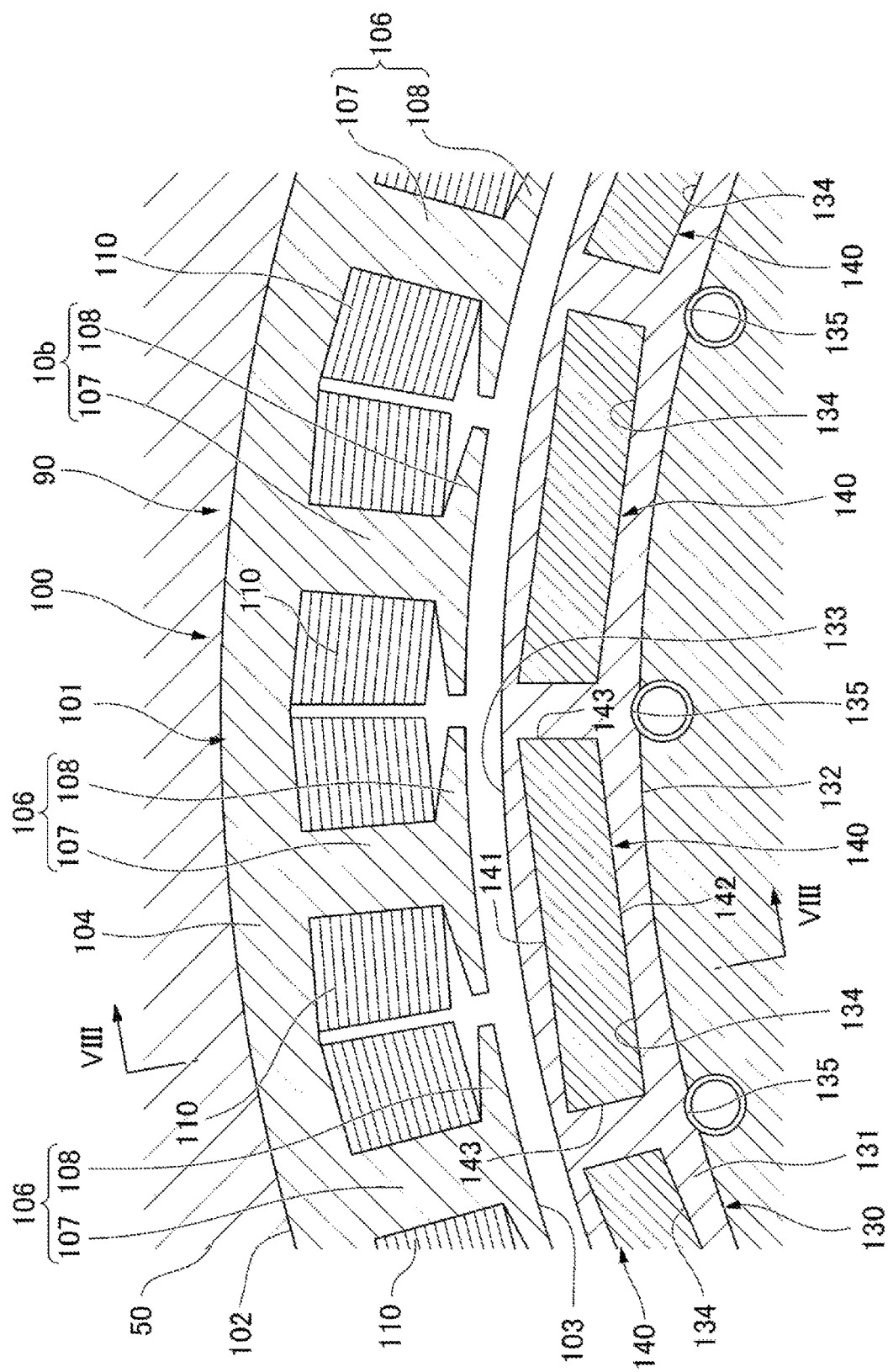
FIG. 7 is a cross-sectional view orthogonal to an axis of a conical motor, taken along line VII-VII in FIG. 3.
Figure 8:
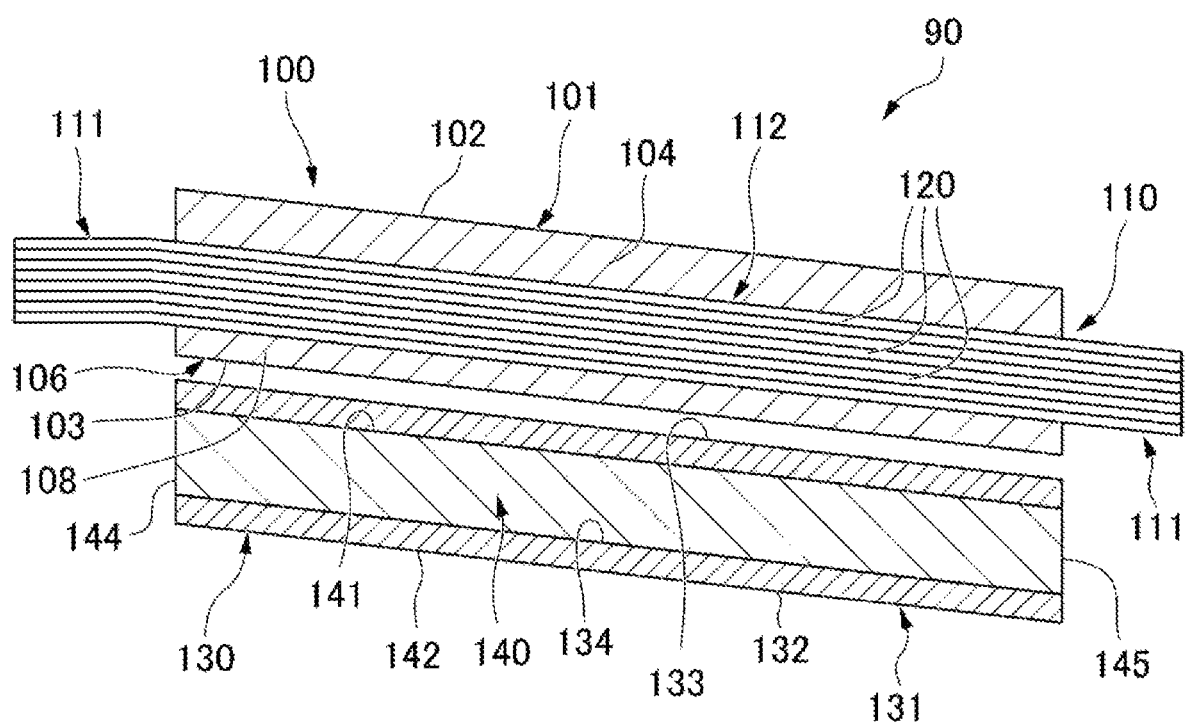
FIG. 8 is a vertical cross-sectional view including the axis of the conical motor, taken along line VIII-VIII in FIG. 7.

As illustrated in FIG. 2 and FIG. 3, the conical stator 100 is fixed in the second cavity 50B of the shroud 50. As illustrated in FIG. 7 and FIG. 8, the conical stator 100 includes a stator core 101 and coils 110.

<Stator Core>

The stator core 101 includes a back yoke 104 forming an annular shape around the axis O, and teeth 106 protruding from the inside surface of the back yoke 104.

The back yoke 104 has an inside surface and an outside surface forming a tapered shape inclined to the inner side in the radial direction, toward the downstream side. Thus, the back yoke 104 as a whole has a shape with a diameter decreasing toward the downstream side. The thickness of the back yoke 104 in the radial direction is constant entirely over the axis O direction and the circumferential direction. The outside surface of the back yoke 104 is a stator outside surface 102. The stator outside surface 102 is fitted and fixed to the tapered fix recess portion 57 in the second cavity 50B of the shroud 50 as illustrated in FIG. 3. Thus, the conical stator 100 is integrally fixed in the second cavity 50B of the shroud 50. The taper angle of the stator outside surface 102 that is the outside surface of the back yoke 104 and the taper angle of the bottom surface of the tapered fix recess portion 57 are set to be the same.

<Teeth>

As illustrated in FIG. 7, a plurality of the teeth 106 are provided at an interval in the circumferential direction on the inner circumference side of the back yoke 104. The teeth 106 each include: a teeth body 107 that is connected to the back yoke 104 and extending in the radial direction; and a teeth distal end portion 108 that is a portion provided to an end portion of the teeth body 107 on the inner side in the radial direction and expanding toward both sides in the circumferential direction from the teeth body 107.

As illustrated in FIG. 8, the protrusion heights of the teeth 106 from the inside surface of the back yoke 104 are constant in the axis O direction. Thus, a stator inside surface 103 that is an end portion of the teeth 106 on the inner side in the radial direction is inclined to the inner side in the radial direction toward the downstream side. In other words, the stator inside surface 103 has a diameter decreasing toward the downstream side. A space between adjacent ones of the teeth 106 serves as a slot accommodating the coil 110.

The teeth 106 are configured to have a thickness, in the circumferential direction, decreasing toward the downstream side. Thus, the plurality of teeth 106 can be arranged without interfering with the inner side of the back yoke 104 having the diameter decreasing toward the downstream side.

<Coils>

A plurality of the coils 110 are provided to surround the respective teeth bodies 107 extending in the radial direction. Each coil 110 is formed by stacking a plurality of coil layers 120 illustrated in FIG. 9 in the radial direction. With each coil layer 120 surrounding the outer surface of the teeth body 107, the coil as a whole is provided to the outer surface of the teeth body 107.

Each coil layer 120 is formed by a rectangular copper wire. The cross-sectional shape of the rectangular copper wire is a shape squashed in an extending direction of the teeth body 107, and thus is a flat shape with the shorter direction matching the radial direction.

Figure 9:
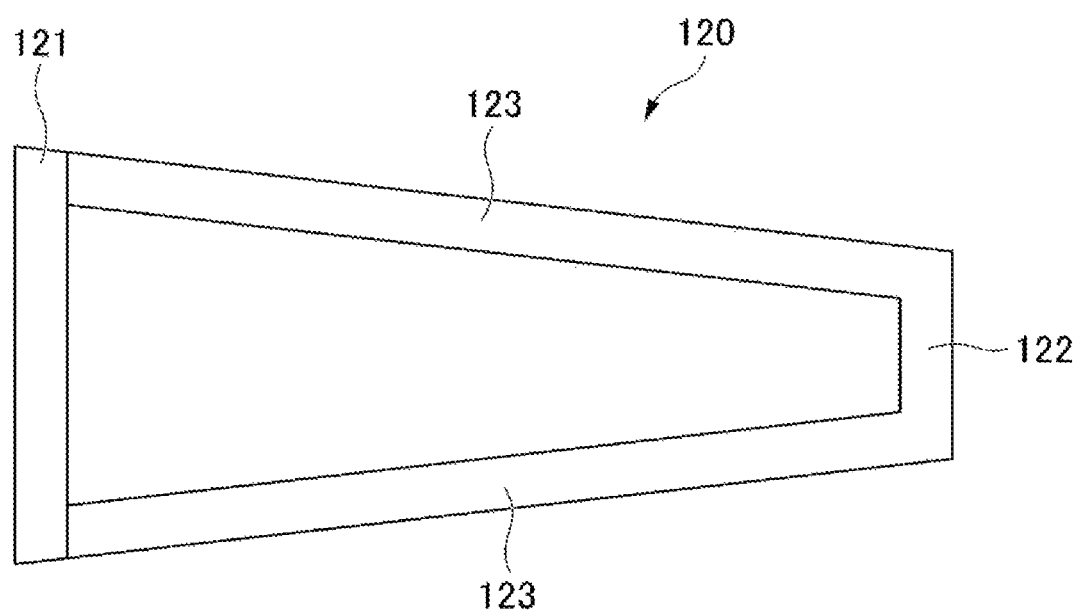
FIG. 9 is a view of a coil layer forming a coil of the conical motor, viewed from the outer side in the radial direction.

The coil layer 120 has a rectangular annular shape surrounding the teeth body 107 as illustrated in FIG. 9, in accordance with the cross-sectional shape of the teeth body 107 orthogonal to the radial direction. A portion of the coil layer 120 extending in the circumferential direction on the upstream side is an upstream piece 121 that comes into contact with the teeth body 107 from the upstream side.

A portion of the coil layer 120 extending in the circumferential direction on the downstream side is a downstream piece 122 that comes into contact with the teeth body 107 from the downstream side. The dimension of the downstream piece 122 in the circumferential direction is shorter than the dimension of the upstream piece 121 in the circumferential direction.

A pair of portions of the coil layer 120 extending in the axis O direction on both sides of the teeth 106 in the circumferential direction are each a side piece 123. The pair of side pieces 123 are in contact with the teeth 106 from both sides in the circumferential direction, and extend to be closer to each other toward the downstream side.

Each coil 110 forms spiral shaped winding around the teeth body 107, with the plurality of coil layers 120 electrically connected to each other and being stacked in the radial direction.

As illustrated in FIG. 8, portions of the coil 110, provided around the teeth 106, at both ends in the axis O direction, that is, portions respectively protruding on the upstream side and the downstream side from the teeth 106 are coil ends 111. A portion of the coil 110 excluding the coil ends 111, that is, a portion in contact with the teeth 106 from both sides in the circumferential direction is a coil main portion 112.

In the present embodiment, as illustrated in FIG. 8, portions of the coil 110 forming the coil main portion 112 and the coil end 111 on the downstream side extend to be inclined to the inner side in the radial direction toward the downstream side. Thus, the side pieces 123 and the downstream piece 122 of each coil layer 120 are arranged to be inclined to the inner side in the radial direction toward the downstream side.

On the other hand, the portion of the coil 110 forming the coil end 111 on the upstream side is bent relative to the coil main portion 112 to extend in parallel with the axis O direction. In other words, the upstream piece 121 of each coil layer 120 is bent relative to the pair of side pieces 123 of the coil layer 120 to extend in parallel with the axis O.

In the present embodiment, the axis O direction positions of the downstream side end portions of the coil layers 120 are the same among the coil layers 120. The axis O direction positions of the upstream side end portions of the coil layers 120 are the same among the coil layers 120. The end portions of the coil ends 111 in the axis O direction are arranged to have the axis O direction positions being the same among the coil layers 120.

<Conical Rotor>

Figure 10:
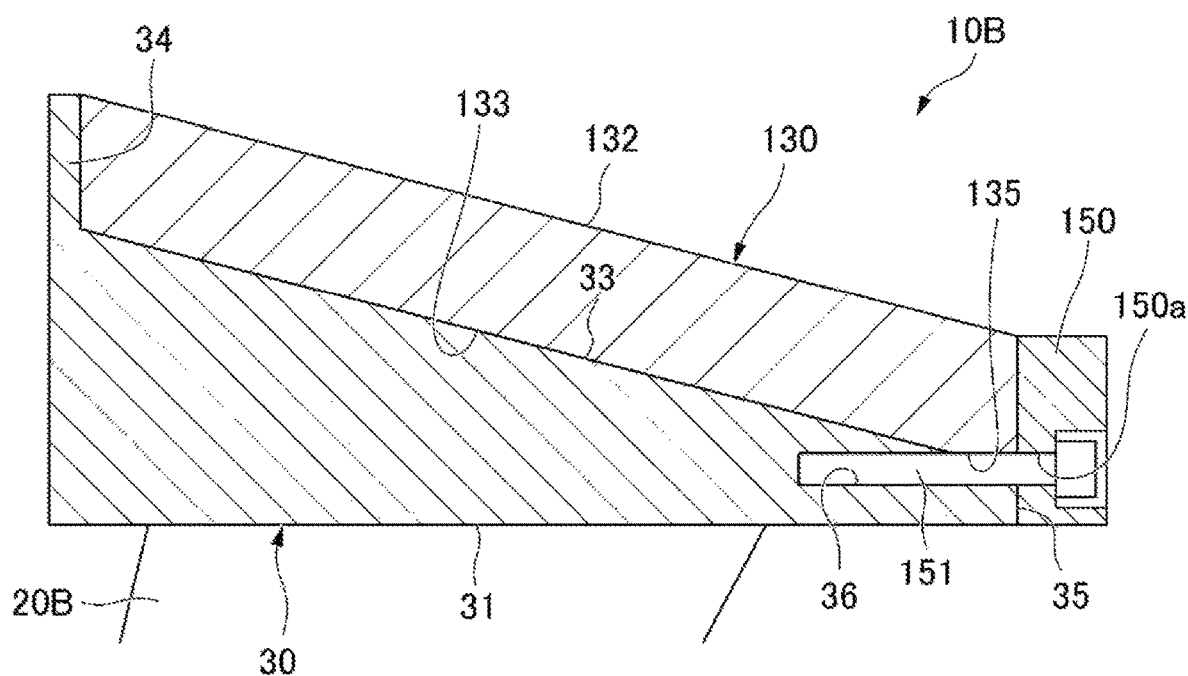
FIG. 10 is a partially enlarged view of FIG. 3 for illustrating the attachment structure of a conical stator to an outer circumference ring.

As illustrated in FIG. 2 and FIG. 3, and illustrated in detail in FIG. 10, the conical rotor 130 is fixed to the outer circumference side of the outer circumference ring 30 of the second propeller 10B. As illustrated in FIG. 7 and FIG. 8, the conical rotor 130 includes a rotor core 131 and permanent magnets 140.

The rotor core 131 has an annular shape around the axis O, and extends in the axis O direction. The inside surface of the rotor core 131 is a rotor inside surface 132. The outside surface of the rotor core 131 is a rotor outside surface 133. The rotor core 131 has the rotor inside surface 132 and the rotor outside surface 133 forming a tapered shape inclined to the inner side in the radial direction, toward the downstream side. Thus, the rotor core 131 as a whole has a shape with a diameter decreasing toward the downstream side. The outer shape of the rotor core 131 is the outer shape of the conical rotor 130.

The rotor inside surface 132 is fitted to the tapered fix surface 33 of the outer circumference ring 30 of the second propeller 10B from the outer circumference side. Thus, the rotor core 131 is integrally fixed to the outer circumference ring 30 of the second propeller 10B. The taper angle of the rotor inside surface 132 and the taper angle of the tapered fix surface 33 are the same.

An insertion hole 134 through which the upstream side end surface and the downstream side end surface of the rotor core 131 are in communication with each other is formed in the rotor core 131. A plurality of the insertion holes 134 are provided at an interval in the circumferential direction. The rotor inside surface 132 and the rotor outside surface 133 extend in parallel. In other words, the insertion hole 134 extends to be inclined to the inner side in the radial direction, toward the downstream side. The dimension of the insertion hole 134 in the radial direction is the same over the axis O direction. The insertion hole 134 is formed to have a distance between its side surfaces, facing each other in the circumferential direction, decreasing toward the downstream side.

<Permanent Magnets>

As illustrated in FIG. 7 and FIG. 8, a plurality of the permanent magnets 140 are provided at an interval from the rotor core 131 in the circumferential direction. Each permanent magnet 140 is inserted in a corresponding one of the insertion holes 134 of the rotor core 131.

Figure 11:
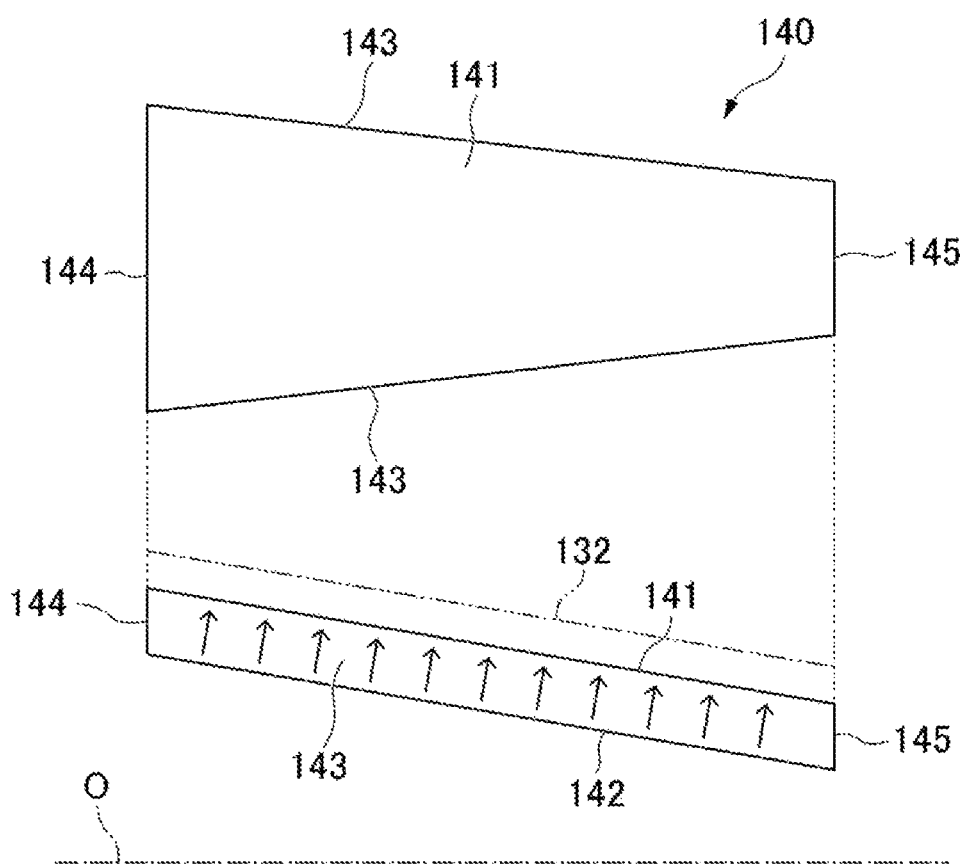
FIG. 11 is a two-view drawing illustrating a permanent magnet of a conical rotor.

As illustrated in FIG. 11, the permanent magnet 140 has a flat plate shape. In a state of being inserted in the insertion hole 134 of the rotor core 131, the permanent magnet 140 has a surface facing the outer side in the radial direction that is a magnet outside surface 141, and has a surface facing the inner side in the radial direction that is a magnet inside surface 142. The magnet outside surface 141 and the magnet inside surface 142 are parallel to each other, and each extend to be inclined to the inner side in the radial direction, toward the downstream side. The magnet outside surface 141 and the magnet inside surface 142 form a trapezoid shape with a dimension in the circumferential direction decreasing toward the downstream side, as viewed in the radial direction.

A pair of surfaces of the permanent magnet 140 facing the circumferential direction are magnet side surfaces 143. The pair of magnet side surfaces 143 connect the magnet outside surface 141 and the magnet inside surface 142 to each other in the radial direction over the axis O direction. The magnet side surfaces 143 extends toward the inner side in the radial direction toward the downstream side, as in the case of the magnet outside surface 141 and the magnet inside surface 142.

The surface of the permanent magnet 140 facing the upstream side is a magnet upstream surface 144. The magnet upstream surface 144 has a planar shape orthogonal to the axis O. The magnet upstream surface 144 is connected to upstream side end portions of the magnet outside surface 141, the magnet inside surface 142, and the pair of magnet side surfaces 143.

The surface of the permanent magnet 140 facing the downstream side is a magnet downstream surface 145. The magnet downstream surface 145 has a planar shape orthogonal to the axis O, and is parallel to the magnet upstream surface 144. The magnet downstream surface 145 is connected to downstream side end portions of the magnet outside surface 141, the magnet inside surface 142, and the pair of magnet side surfaces 143.

The magnetization direction of the permanent magnet 140 is a direction inclined to the downstream side, toward the outer side in the radial direction, as indicated by the arrows in FIG. 11. More specifically, the magnetization direction is a direction orthogonal to the magnet inside surface 142 and the magnet outside surface 141, and is a direction from the magnet inside surface 142 toward the magnet outside surface 141. The inclination angles of the magnet inside surface 142 and the magnet outside surface 141 relative to the axis O are the same as the taper angle of the rotor outside surface 133. Thus, the magnetization direction of the permanent magnet 140 is a direction orthogonal to the outside surface of the rotor. The permanent magnet 140 is uniformly magnetized in a direction along the magnet inside surface 142 and the magnet outside surface 141.

In the conical motor 90, the conical rotor 130 is rotationally driven about the axis O, by the rotating magnetic field generated when the coils 110 of the conical stator 100 are energized. The rotation direction of the conical motor 90 is opposite to the rotation direction of the tubular motor 80. Thus, the rotational directions of the conical motor 90 and the tubular motor 80 are opposite to each other.

As illustrated in FIG. 10, the conical rotor 130 has the upstream side end portion in contact with the holding portion 34 from the downstream side, while being fixed to the outer circumference ring 30 of the second propeller 10B.

The downstream side end portion of the conical rotor 130 is held by a second holding plate 150 from the downstream side.

The downstream side end portion of the conical rotor 130 and the downstream end surface 35 of the outer circumference ring 30 each have a planar shape orthogonal to the axis O, and are arranged to be flush with each other. The second holding plate 150 is in contact with both the downstream side end portion of the conical rotor 130 and the downstream end surface 35 of the outer circumference ring 30. The second holding plate 150 has a plate shape extending entirely over the circumferential direction, in accordance with the shapes of the downstream side end portion of the conical rotor 130 and the downstream end surface 35 of the outer circumference ring 30.

This second holding plate 150 is fixed to the outer circumference ring 30 by a holding bolt 151. The holding bolt 151 is fastened to a bolt stop hole 150a formed to be recessed from the downstream end surface 35 of the outer circumference ring 30, after being inserted, from the downstream side, into the bolt stop hole 150a formed through the second holding plate 150 in the axis O direction.

As illustrated in FIG. 9 in addition to FIG. 10, one portion of the holding bolt 151 in the circumferential direction is accommodated in a notched portion 135 formed to be recessed from the outside surface of the rotor core 131, in a portion around an opening portion of the bolt stop hole 150a. The notched portion 135 is formed in a portion between the adjacent ones of the permanent magnets 140 in the circumferential direction in the rotor core 131.

Operational Effects

The underwater vehicle 1 having the configuration described above can cruise underwater, with the propulsion apparatus 8 driven. Specifically, when the tubular motor 80 in the first cavity 50A of the shroud 50 is driven, the first propeller 10A integrally fixed to the tubular rotor 82 of the tubular motor 80 rotates about the axis O, toward one side in the circumferential direction. As a result, the water is pumped toward the downstream side by the first blades 20A positioned in the flow path. When the conical motor 90 is driven simultaneously with the driving of the tubular motor 80, the second propeller 10B integrally fixed to the conical rotor 130 of the conical motor 90 rotates about the axis O toward the other side in the circumferential direction. As a result, the water is pumped toward the downstream side by the second blades 20B positioned in the flow path.

Then, thrust force toward the upstream side is generated at the first propeller 10A and the second propeller 10B, as a reaction force produced by the pumping of the water. The thrust force is transmitted to the shaft portion 3 from the inner circumference rings 11 of the first propeller 10A and the second propeller 10B, via the water film and the upstream side thrust bearing 42. As a result, the thrust force acts on the shaft portion 3 and the vehicle body 2 integrated therewith, whereby the underwater vehicle 1 is propelled.

In the propulsion apparatus 8 of the present embodiment, as illustrated in FIG. 2 and FIG. 3, the shroud 50 has the diameter decreasing toward the downstream side, and the shaft portion 3 has the diameter decreasing toward the downstream side. Thus, the flow path formed between the shroud 50 and the shaft portion 3 has a shape that is narrowed to the inner side in the radial direction toward the downstream side, meaning that the flow path cross-sectional area decreases toward the downstream side.

When the water is pumped by the first blades 20A and the second blades 20B, the flow rate of the water increases, resulting in the flow of the water narrowed on the inner side in the radial direction. In the present embodiment, the flow path has a shape suitable for the flow of the water, whereby water pumping efficiency can be improved.

In the present embodiment, the shape of the shroud 50 has the diameter gradually decreasing toward the downstream side, and thus has a tapered shape to have a smaller diameter toward the downstream side. In accordance with this shape of the shroud 50, the conical motor 90 accommodated in the shroud 50 also has a tapered shape with a diameter decreasing toward the downstream side. Thus, the conical motor 90 as the outer periphery driving device can be arranged along the shape of the shroud 50. Thus, the shape of the shroud 50 does not need to be undesirably upsized in accordance with the configuration of the motor, meaning that the shroud 50 as a whole can have a compact configuration.

In the present embodiment, with the shroud 50 thus having a compact configuration, drag in water while the underwater vehicle 1 is being propelled is small. Thus, the speed of the underwater vehicle 1 can be increased, and the propulsion efficiency can be improved.

Furthermore, in the present embodiment, the cross-sectional shape of the shroud 50 is of a blade form with the upstream side being the leading edge and the downstream side being the trailing edge, whereby drag in water can be minimized. Furthermore, the camber line of the blade form cross section of the shroud 50 is inclined to the inner side in the radial direction toward the downstream side, whereby the shroud 50 as a whole, forming the blade form, has a tapered shape with the diameter decreasing toward the downstream side. Thus, the shape of the shroud 50 conforms to the flow direction of the water pumped, whereby the pump efficiency can be further improved.

Here, in a case where the shape of the motor accommodated in the shroud 50 does not conform to the shape of the shroud 50, in order to maintain the blade form while accommodating the motor, the curved shapes of the shroud outside surface 52 and the shroud inside surface 51 may need to undesirably bulge to conform to the motor. In other words, the shape of the shroud 50 may need to be upsized to conform to the motor.

On the other hand, in the present embodiment, the conical motor 90 arranged in the shroud 50 has a tapered shape corresponding to the shape of the shroud 50, whereby the blade form shape of the shroud 50 does not need to be undesirably upsized in accordance with the conical motor 90. Thus, the shroud 50 can have a compact shape, while maintaining the blade form. Thus, drag in water during the propelling can be minimized.

In addition, in the present embodiment, contra-rotating propellers are used in which the rotational directions of the first propeller 10A on the upstream side and the second propeller 10B on the downstream side are inverted. Thus, the swirling flow generated due to the pumping of water by the first propeller 10A can be collected by the inverse rotation of the second propeller 10B Thus, the swirling loss at the slipstream of the second propeller 10B can be reduced.

When the water is sucked in, the drag in water tends to increase due to the pressure interference between the first blades 20A of the first propeller 10A positioned on the upstream side and the shaft portion 3. In particular, a configuration in which the load is concentrated over the entirety of the leading edge of each blade in order to improve propeller efficiency results in a significant drag in water.

On the other hand, in the present embodiment, as illustrated in FIGS. 4A and 4B, the load distribution on the suction side of the first blade 20A is of a balanced load type in which the load is distributed in the axis O direction with the load on the inner side in the radial direction being small. Thus, an increase in fluid drag due to the pressure interference can be minimized.

On the other hand, the suction side pressure distribution of the second blade 20B of the second propeller 10B on the downstream side, which is less likely to involve the pressure interference with the shaft portion 3, is of a leading edge load type in which the load is concentrated on the leading edge, so that the propeller efficiency can be improved.

As illustrated in FIG. 3, the thrust force of the first propeller 10A and the second propeller 10B is transmitted to the shaft portion 3 via the upstream side thrust bearing 42. In other words, the thrust force is transmitted to the upstream side thrust bearing 42 as a load. When the thrust force is large, the load transmitted to the upstream side thrust bearing 42 is also large, meaning that the load on the upstream side thrust bearing 42 is large.

In the present embodiment, when the conical motor 90 is driven, electromagnetic force acts in the direction (gap direction) in which the conical rotor 130 and the conical stator 100 of the conical motor 90 face. The electromagnetic force is in a direction toward the outer side in the radial direction and toward the downstream side. Thus, force toward the downstream side, as a component of the electromagnetic force in the axis O direction, is applied to the conical rotor 130.

Thus, on the conical rotor 130, force pulling it toward the downstream side acts. As a result, the load applied to the upstream side thrust bearing 42 from the second propeller 10B is reduced, whereby the thrust load produced by the upstream side thrust bearing 42 can be reduced.

Furthermore, in the present embodiment, by decoupling the coupling portion 70 illustrated in FIG. 5, the shroud 50 can be separated into a plurality of segments (the upstream segment 61, the intermediate segment 62, and the downstream segment 63). Thus, the tubular stator 81 of the tubular motor 80 and the conical stator 100 of the conical motor 90 illustrated in FIG. 3 can be easily attached in the shroud 50.

As illustrated in FIG. 5 and FIG. 6, the coupling portion 70 has a convex curved shape protruding from the outside surface of the shroud 50, and the cross-sectional shape along the outside surface of the shroud 50 is of a blade form with the upstream side being the protruding portion leading edge 70a and the downstream side being the protruding portion trailing edge 70b. Thus, drag due to the coupling portion 70 while the underwater vehicle 1 is being propelled can be suppressed.

The conical stator 100 of the conical motor 90 of the present embodiment is accommodated in the second cavity 50B, and between the intermediate segment 62 and the downstream segment 63 defining and forming the second cavity 50B, is fixed only to the second cavity 50B of downstream side segment.

The force toward the downstream side, which is a component of the electromagnetic force, acts on the conical rotor 130 as described above, whereas the force toward the upstream side, which is a component of the electromagnetic force, acts on the conical stator 100, which is paired with the conical rotor 130. Thus, the force toward the upstream side also acts on the downstream segment 63, to which the conical stator 100 is integrally attached.

As a result, the downstream segment 63 is pressed against the intermediate segment 62 by the force. Thus, the downstream segment 63 and the intermediate segment 62 can be more rigidly fixed and integrated to each other, and the fastening force of the coupling portion 70 coupling these bodies can be relaxed. Accordingly, a fastening bolt with a smaller diameter can be used for the fastening portion, and the coupling portion 70 can be made compact, whereby the drag due to the coupling portion 70 against the flow of water can be further reduced.

The conical stator 100 of the conical motor 90 has a tapered shape corresponding to the shape of the shroud 50. This contributes to making the shroud 50 compact, while providing the function of the stator of the motor.

As illustrated in FIG. 9, the coil layers 120, forming the respective layers of the coil 110, have a configuration corresponding to the outer surface of the teeth 106, that is, a rectangular annular shape with a distance in the circumferential direction decreasing toward the downstream side, whereby the coil 110 can be arranged with a high density relative to the teeth 106.

Furthermore, as illustrated in FIG. 8, the coil layers 120, forming the respective layers of the coil 110, are inclined to the inner side in the radial direction toward the downstream side, in accordance with the tapered shape of the teeth 106. Thus, the coil 110 can be arranged with a high density relative to the stator core 101 of the conical stator 100.

The positions of the upstream side end portion and the downstream side end portion of the coil ends 111 in the axis O direction are the same among the coil layers 120, whereby the coil 110 can be highly densely arranged with a compact dimension in the axis O direction.

If the coil layers 120, formed using the rectangular copper wires with the same cross-sectional shape, are stacked without the positions of the end portions of the coils 110 in the axis O direction matching, a gap is formed between the coil layers 120 and the teeth 106 in the axis O direction. In such a case, the amount of leakage magnetic flux is large, and thus the motor efficiency is compromised. In the present embodiment, the coil layers 120 can be highly densely arranged with the gap between the coil layers 120 and the teeth 106 minimized. Thus, the motor efficiency can be improved.

Furthermore, the coil 110 as a whole can have a shorter length, whereby the copper loss of the coil 110 can be reduced, so that the efficiency of the motor can be improved.

In the present embodiment, the upstream side end portion of the coil layer 120 forming each layer of the coil 110 is configured to be bent to be parallel to the axis O. Thus, the gap between the rectangular copper wire and the teeth 106 at the coil end 111 can be minimized, while increasing the density of the layers at the coil end 111.

The conical rotor 130 of the conical motor 90 has a tapered shape corresponding to the tapered shape of the shroud 50. This contributes to making the shroud 50 compact, while providing the function of the rotor of the motor.

Furthermore, in the present embodiment, the magnetization direction of the permanent magnet 140 is orthogonal to the rotor outside surface 133 of the conical rotor 130, instead of simply being in the radial direction. In other words, the magnetization direction of the permanent magnets 140 matches the direction in which the rotor and the stator face. Thus, the contribution of the permanent magnet 140 to the torque can be maximized, whereby the torque of the conical motor 90 can be improved.

The electromagnetic force toward the outer side in the radial direction and the downstream side acts on the rotor core 131 of the conical motor 90. In view of this, in the present embodiment, the rotor core 131 is held by the second holding plate 150 from the downstream side, and thus can be prevented from falling down toward the downstream side.

The thickness of the downstream end of the outer circumference ring 30 of the second propeller 10B in the radial direction is small. Thus, a bolt hole 36 might be difficult to form in a portion of the downstream end of the outer circumference ring 30. Formation of the bolt hole 36 despite such difficulty leads to insufficient strength of the outer circumference ring 30, and thus is not preferable. On the other hand, in the present embodiment, the notched portion 135 receiving a part of the outside surface of the holding bolt 151 is formed in the rotor. Thus, the holding bolt 151 is inserted to be guided into the notched portion 135. A part of the load from the holding bolt 151 can be received by the notched portion 135. Thus, the holding bolt 151 can be appropriately fixed with respect to the outer circumference ring 30, whereby the rotor core 131 can be more effectively prevented from falling by the second holding plate 150.

The movement of the rotor core 131 relative to the outer circumference ring 30 in the circumferential direction can be restricted by the notched portion 135. Thus, the rotor core 131 can be prevented from undesirably displaced in the circumferential direction, and the rotor core 131 and the outer circumference ring 30 can be more rigidly fixed to each other.

The notched portion 135 is formed in a portion between the adjacent ones of the permanent magnets 140, in the rotor core 131. If the notched portion 135 is formed in a portion on the outer side in the radial direction of the permanent magnet 140, passage of a magnetic flux through the rotor core 131 is hindered, resulting in an increase in the magnetic resistance. With the notched portion 135 formed between the adjacent permanent magnets 140 as in the present embodiment, erosion of the magnetic path of the rotor core 131 can be minimized, whereby the increase in the magnetic resistance can be suppressed.

OTHER EMBODIMENTS

The embodiment of the disclosure has been described above, but the disclosure is not limited thereto, and may be modified as appropriate within a range that does not deviate from the technical concept of the disclosure.

While in the embodiment, an example is described in which only the motor that drives the second propeller 10B, of the two propellers, the first propeller 10A and the second propeller 10B, is the conical motor 90, the motor that drives the first propeller 10A, as well as the second propeller 10B, may be a motor having a conical shape. Alternatively, the motor that drives the first propeller 10A may have a conical shape, whereas the motor that drives the second propeller 10B may have a tubular shape. That is, it suffices if the motor that drives at least one of the first propeller 10A and the second propeller 10B is a conical-shaped motor.

Furthermore, three or more propellers may be provided, an outer periphery driving motor may be provided so as to correspond to these propellers, and at least one of these motors may be a conical-shaped motor.

As the propulsion apparatus 8, only one propeller and a motor that drives the propeller may be provided, and this motor may have a conical shape.

In either case, the motor can be arranged in such a manner conforming to the shape of the shroud 50 with the decreasing diameter, and thus the shroud 50 can be made compact.

In the embodiment, an example is described in which the cross-sectional shape of the shroud 50 is of a blade form. However, the blade form should not be construed in a limiting sense. The cross-sectional shape of the shroud 50 is preferably a streamline shape, but may be other shapes such as a rectangular shape, for example. Also in this case, with the shroud 50 having the diameter decreasing toward the downstream side, a flow path with a flow path cross-sectional area decreasing toward the downstream side is defined and formed.

In the embodiment, an example is described in which the shroud 50 is split into three segments, in accordance with the number of motors. However, the disclosure is not limited to this, and a configuration may be employed in which the shroud 50 is split into two in the axis O direction with the outer circumference ring 30 of the propeller and motor disposed therebetween. Furthermore, a configuration may be employed in which the shroud 50 is split into four or more in the axis O direction, with the outer circumference ring 30 of the propeller and motor disposed between adjacent ones of the segments.

In the embodiment, a configuration is described in which the conical stator 100 of the conical motor 90 is fixed only to the downstream segment 63, out of the intermediate segment 62 and the downstream segment 63. However, the disclosure is not limited to this. The conical stator 100 may be fixed not only to the downstream segment 63, but may also be fixed to the intermediate segment 62. Thus, the stator of the motor may be fixed to both of the adjacent segments.

More preferably, the conical stator 100 may be fixed to only the downstream side segment, of the adjacent segments. With this configuration, as in the embodiment, the adjacent segments may be more rigidly fixed in the axis O direction, and the coupling portion 70 can be made compact.

Figure 12:
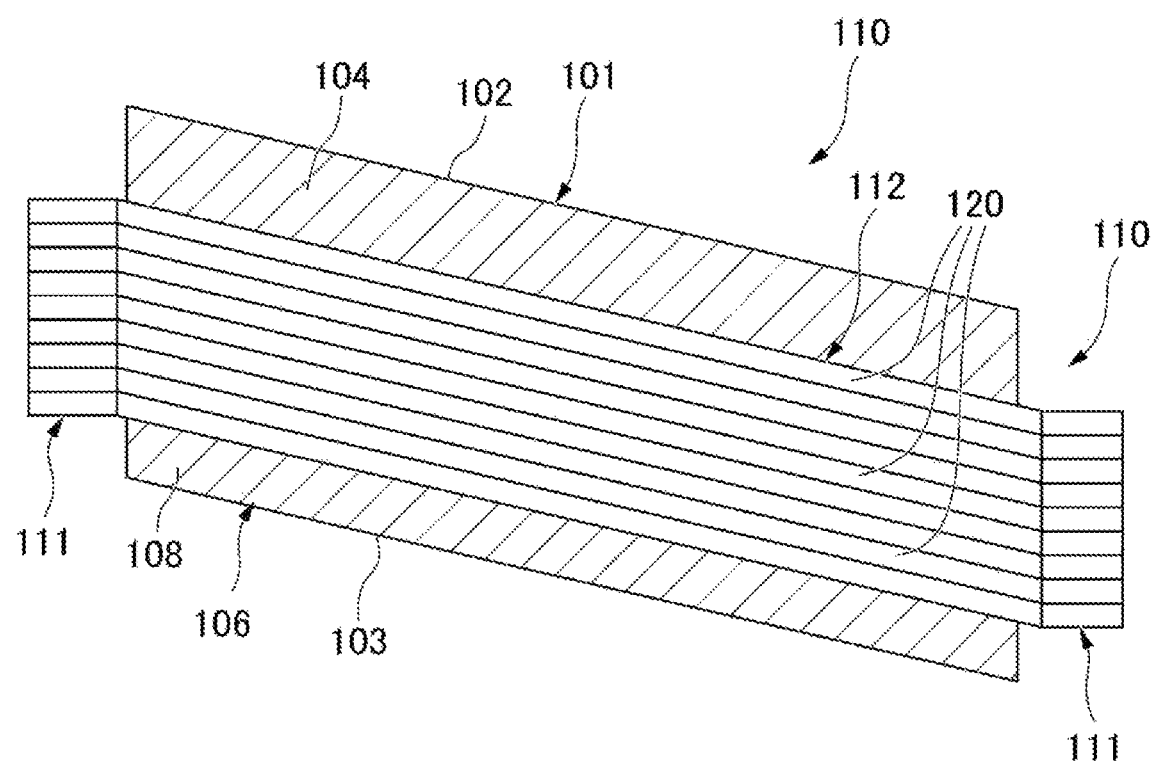
FIG. 12 is a vertical cross-sectional view of a conical stator according to a first modification.
Figure 13:
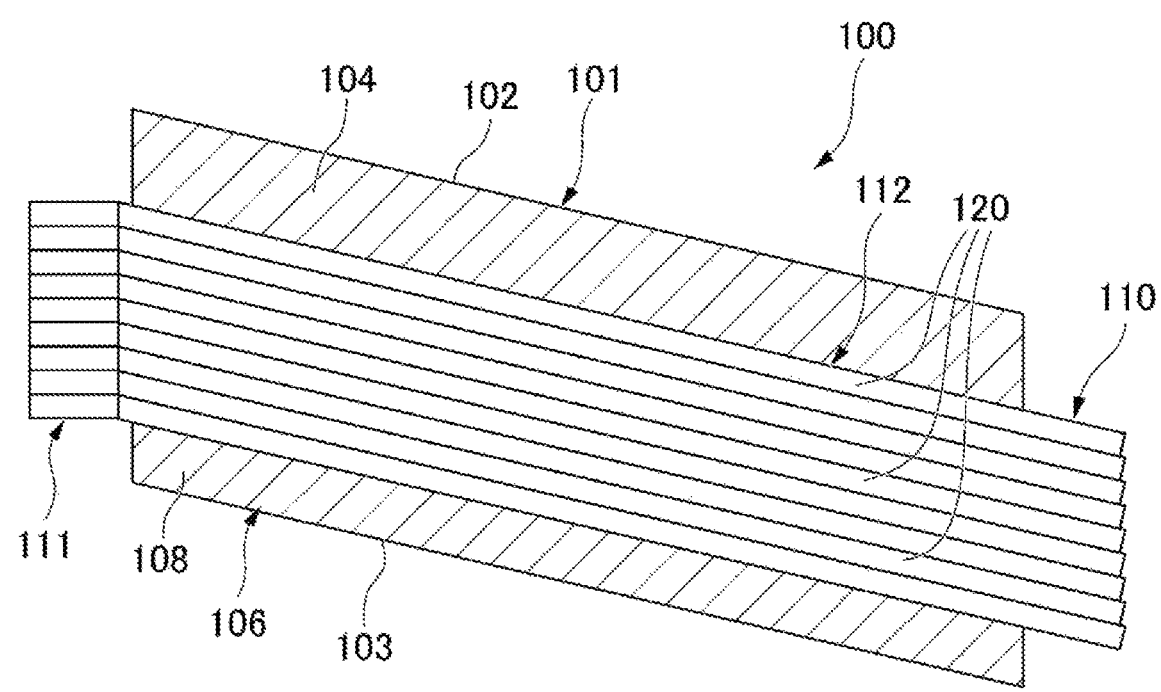
FIG. 13 is a vertical cross-sectional view of a conical stator according to a second modification.

In the embodiment, an example is described in which, out of the coil ends 111 on the upstream side and the downstream side, only the coil end 111 on the upstream side is bent to be parallel to the axis O. However, the disclosure is not limited to this, and as a first modification, for example, the coil ends 111 on the upstream side and the downstream side may both have a shape bent to be parallel to the axis O as illustrated in FIG. 12. Furthermore, as a second modification, as illustrated in FIG. 13, a shape may be employed in which only the coil end 111 on the downstream side is bent to be in the axis O direction. Also with these configurations, operational effects as those in the embodiment can be obtained.

Furthermore, in the embodiment, an example is described in which the fluid machine according to the disclosure is applied to the propulsion apparatus 8 of the underwater vehicle 1. However, the disclosure is not limited to this, and for example, the fluid machine may be applied to the propulsion apparatus 8 of a ship or the like that cruises on water.

The fluid machine according to the disclosure is not limited to the propulsion apparatus 8, and may be applied to other fluid machines used underwater such as a pump. Furthermore, the disclosure is not limited to a fluid machine that pumps water, and may be applied to a fluid machine that pumps other types of liquid such as oil.

Notes

The propulsion apparatus (fluid machine) 8 and the underwater vehicle 1 described in each of the embodiments are construed as follows, for example.

(1) A fluid machine according to a first aspect includes: a shaft portion 3 extending in an axis O direction; a shroud 50 provided to surround the shaft portion 3 and having a diameter decreasing from an upstream side on one side in the axis O direction toward a downstream side on another side in the axis O direction, a flow path being formed between the shroud 50 and the shaft portion 3 and having a flow path cross-sectional area decreasing toward the downstream side; a propeller rotatably provided about the axis O between the shaft portion 3 and the shroud 50 and configured to pump a fluid from the upstream side toward the downstream side; and a motor provided to correspond to the propeller, the motor including a rotor having a ring-like shape and being fixed to an outer circumference portion of the propeller and accommodated in the shroud 50 and a stator having a ring-like shape surrounding the rotor and being fixed in the shroud 50, in which the motor is a conical motor 90 in which diameters of the rotor and the stator decrease from the upstream side toward the downstream side.

With the configuration described above, the shroud 50 has the diameter decreasing toward the downstream side, and the flow path cross-sectional area of the flow path on the inner side decreases toward the downstream side, whereby pumping efficiency of a fluid can be improved.

In addition, the configuration described above employs the conical motor 90 with the rotor and the stator having a diameter decreasing, as the diameter of the shroud 50 decreases toward the downstream side. Thus, the shape of the shroud 50 does not need to be upsized to conform to the configuration of the motors, whereby a compact configuration can be achieved.

(2) A fluid machine according to a second aspect is the fluid machine according to (1), in which the shroud 50 has a cross-sectional shape, orthogonal to the axis O, of a blade form with an end portion on the upstream side corresponding to a leading edge and an end portion on the downstream side corresponding to a trailing edge.

The cross-sectional shape of the shroud 50 is of a blade form, whereby drag due to a flow of water can be minimized when the fluid machine is disposed underwater. A shape is achieved that conforms to the flow direction of the fluid pumped by the propeller, whereby the pump efficiency can be further improved.

On the other hand, in order to maintain the blade form while accommodating the motor inside, the shape of the shroud 50 may need to be upsized more than required to conform to the shape of the motor. In view of this, in the present aspect, the motor is the conical motor 90 conforming to the shape of the shroud 50, whereby the size of the shroud 50 can be reduced.

(3) A fluid machine according to a third aspect is the fluid machine according to (1) or (2), in which two of the propellers are provided in the axis O direction, rotational directions of the two propellers are opposite to each other, the motor is provided so as to correspond to each of the two propellers, and at least one of two of the motors is the conical motor 90.

With the use of contra-rotating propellers in which the rotational directions of the first propeller 10A on the upstream side and the second propeller 10B on the downstream side are inverted, the swirling flow generated by the first propeller 10A can be collected by the second propeller 10B. Thus, the swirling loss at the slipstream of the propeller on the downstream side can be reduced.

Furthermore, even if two motors are provided, at least one of them is the conical motor 90, and thus the upsizing of the shroud 50 can be suppressed.

(4) A fluid machine according to a fourth aspect is the fluid machine according to (3), in which each of the propellers includes a plurality of blades arranged in a circumferential direction, a suction side pressure distribution of the blade of the propeller on the downstream side is of a leading edge load type with a load concentrated on a leading edge, and a suction side pressure distribution of the blade of the propeller on the upstream side is of a balanced load type, with a load more distributed in the axis O direction than in the suction side pressure distribution of the blade on the downstream side, and with a load being smaller on an inner side in a radial direction.

Here, between the blade on the upstream side and the shaft portion 3, fluid drag tends to increase due to pressure interference in sucking water. In particular, a configuration in which the load is concentrated over the entirety of the leading edge of the blade in order to improve propeller efficiency makes this tendency more significant. In the present aspect, the suction side pressure distribution of the blade on the upstream side is of a balanced load type, and thus, an increase in fluid drag due to the pressure interference can be minimized.

On the other hand, the suction side pressure distribution of the blade on the downstream side is of a leading edge load type in which the load is concentrated on the leading edge, so that the propeller efficiency can be improved.

(5) A fluid machine according to a fifth aspect is the fluid machine according to any one of (1) to (4), in which the propeller includes an inner circumference ring 11 fitted to an outer circumference side of the shaft portion 3 across a clearance, and the fluid machine further includes: a thrust bearing fixed to the shaft portion 3 and facing the upstream side of the inner circumference ring 11 entirely over a circumferential direction; and a strut 78 supporting the shroud 50 relative to the shaft portion 3.

When the propeller is rotating, a load is applied on the propeller itself toward the upstream side as a reaction force produced by pumping of a fluid. The load on the propeller is supported by the thrust bearing. When the conical motor is being driven, the electromagnetic force toward the outer side in the radial direction and the downstream side acts on the conical rotor 130. Thus, on the conical rotor 130, force to pull it toward the downstream side acts. As a result, the load applied to the thrust bearing from the propeller is reduced, whereby the thrust load can be reduced.

(6) A fluid machine according to a sixth aspect is the fluid machine according to any one of (1) to (5), in which the shroud 50 includes a plurality of segments of the shroud 50 divided into a plurality of pieces in the axis O direction, and the fluid machine further includes a coupling portion 70 configured to couple the plurality of segments in the axis O direction.

By decoupling the coupling portion 70, the shroud 50 can be separated into a plurality of segments. This makes it easy to attach the rotor and the stator of the motors in the shroud 50.

(7) A fluid machine according to a seventh aspect is the fluid machine according to (6), in which the coupling portion 70 has a convex curved shape protruding from an outside surface of the shroud 50, and a cross-sectional shape along the outside surface of the shroud 50 is of a blade form with the upstream side being a leading edge and the downstream side being a trailing edge.

Thus, drag due to the coupling portion 70 can be suppressed when water is flowing on the outside surface of the shroud 50.

(8) A fluid machine according to an eighth aspect is the fluid machine according to any one of (1) to (7), in which the stator includes: a stator core 101 having a back yoke 104 forming an annular shape around the axis O and having a diameter decreasing toward the downstream side, and a plurality of teeth 106 protruding from an inside surface of the back yoke 104 to the inner side in a radial direction, extending in a circumferential direction entirely over the axis O direction, and having a thickness in the circumferential direction decreasing, with a diameter decreasing, toward the downstream side; and a plurality of coils 110 provided to surround each of the teeth 106.

As a result, the configuration of the stator can have a conical shape that conforms to the shape of the shroud 50 with the decreasing diameter.

(9) A fluid machine according to a ninth aspect is the fluid machine according to (8), in which each of the coils 110 includes a rectangular copper wire having a flat shape with a plurality of layers stacked in the radial direction around the teeth 106, and each layer of the coil 110 has a rectangular shape with a distance in the circumferential direction decreasing toward the downstream side, as viewed in the radial direction.

By configuring the shape of respective layers of the coil 110 that conforms to the teeth 106, the coil 110 can be arranged with a high density relative to the teeth 106.

(10) A fluid machine according to a tenth aspect is the fluid machine according to (9), in which each layer of the coil 110 is inclined to the inner side in the radial direction toward the downstream side.

As a result, the coil 110 can be efficiently disposed, with respect to the teeth 106 extending to be inclined to the inner side in the radial direction toward the upstream side.

(11) A fluid machine according to an eleventh aspect is the fluid machine according to (10), in which axis O direction positions of end portions of coil ends 111 of each coil 110 in the axis direction match each other in each layer.

With this configuration, the coil 110 can be highly densely arranged with a compact dimension in the axis O direction. Because the coil 110 as a whole has a shorter length, the efficiency of the motor can be improved.

(12) A fluid machine according to a twelfth aspect is the fluid machine according to (11), in which a portion of each layer of the coil 110 forming the coil end 111 is bent to be in parallel with the axis O.

Thus, the gap between the rectangular copper wire and the teeth 106 at the coil end 111 can be minimized, while increasing the density of the layers at the coil end 111.

(13) A fluid machine according to a thirteenth aspect is the fluid machine according to any one of (1) to (12), in which the rotor includes: a rotor core 131 forming a tubular shape around the axis O and having a diameter decreasing toward the downstream side; and a plurality of permanent magnets 140 provided at an interval from the rotor core 131 in a circumferential direction and extending entirely over the axis O direction, and the permanent magnets 140 extend to be inclined to an inner side in a radial direction toward the downstream side and have a width in the circumferential direction decreasing toward the downstream side.

As a result, the configuration of the rotor can have a conical shape that conforms to the shape of the shroud 50 with the decreasing diameter.

(14) A fluid machine according to a fourteenth aspect is the fluid machine according to (13), in which a magnetization direction of the permanent magnets 140 is orthogonal to an outside surface of the rotor.

The magnetization direction of the permanent magnet 140 matches the direction in which the rotor and the stator face, instead of simply being in the radial direction, whereby the torque of the motor can be improved.

(15) A fluid machine according to a fifteenth aspect is the fluid machine according to (13) or (14), in which the propeller further includes an outer circumference ring 30 having a ring-like shape forming the outer circumference portion of the propeller, the rotor core 131 is fitted to an outside surface of the outer circumference ring 30, and the fluid machine further includes: a holding plate that is in contact with end portions of the outer circumference ring 30 and the rotor core 131 on the downstream side; and a holding bolt 151 provided through the holding plate in the axis O direction and fixing the holding plate to the outer circumference ring 30.

The electromagnetic force toward the outer side in the radial direction and the downstream side acts on the rotor core 131 of the conical motor 90. In view of this, the rotor core 131 is held by the holding plate from the downstream side, and thus can be suppressed from falling down.

(16) A fluid machine according to a sixteenth aspect is the fluid machine according to (15), in which the outer circumference ring 30 has a thickness in the radial direction decreasing toward the downstream side, and a notched portion 135 is formed in a portion between adjacent ones of the permanent magnets 140 at an end portion of the rotor core 131 on the downstream side, the notched portion 135 receiving a part of an outside surface of the holding bolt 151 inserted into the holding plate.

The thickness of the downstream end of the outer circumference ring 30 in the radial direction is small. Thus, the bolt hole 36 may fail to be formed in a portion of the downstream end of the outer circumference ring 30 depending on the diameter of the bolt. On the other hand, the notched portion 135 receiving a part of the outside surface of the holding bolt 151 is formed in the rotor. Thus, insertion of the holding bolt 151 is allowed, so that the holding bolt 151 can be appropriately fixed with respect to the outer circumference ring 30.

The movement of the rotor core 131 relative to the outer circumference ring 30 in the circumferential direction can be restricted by the notched portion 135.

Furthermore, with the notched portion 135 formed in a portion between the permanent magnets 140 in the rotor core 131, erosion of the magnetic path of the rotor core 131 can be minimized, whereby the increase in the magnetic resistance can be suppressed.

(17) An underwater vehicle 1 according to a seventeenth aspect includes: a vehicle body 2; and a propulsion apparatus 8 provided to the vehicle body 2, in which the propulsion apparatus 8 is the fluid machine described in any one of (1) to (15).

With such an underwater vehicle 1, the propulsion apparatus 8 can be made compact, while the propulsion efficiency is improved.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A fluid machine comprising:
a shaft portion extending in an axial direction;
a shroud provided to surround the shaft portion and having a diameter decreasing from an upstream side on one side in the axial direction toward a downstream side on another side in the axial direction, a flow path being formed between the shroud and the shaft portion and having a flow path cross-sectional area decreasing toward the downstream side;
a propeller rotatably provided about an axis between the shaft portion and the shroud and configured to pump a fluid from the upstream side toward the downstream side; and
a motor provided to correspond to the propeller, the motor including
a rotor having a ring shape and being fixed to an outer circumference portion of the propeller and accommodated in the shroud, and
a stator having a ring shape surrounding the rotor and being fixed in the shroud, wherein;
the motor is a conical motor in which diameters of the rotor and the stator decrease from the upstream side toward the downstream side;
the shroud includes a plurality of segments of the shroud divided into a plurality of pieces in the axial direction; and
the fluid machine further includes a coupling portion configured to couple the plurality of segments in the axial direction.

2. The fluid machine according to claim 1, wherein the shroud has a cross-sectional shape, orthogonal to the axis, of a blade form with an end portion on the upstream side corresponding to a leading edge and an end portion on the downstream side corresponding to a trailing edge.

3. The fluid machine according to claim 1, wherein
two of the propellers are provided in the axial direction,
rotational directions of the two propellers are opposite to each other,
the motor is provided so as to correspond to each of the two propellers, and
at least one of two of the motors is the conical motor.

4. The fluid machine according to claim 3, wherein
each of the propellers includes a plurality of blades arranged in a circumferential direction,
a suction side pressure distribution of the blade of the propeller on the downstream side is of a leading edge load type with a load concentrated on a leading edge, and
a suction side pressure distribution of the blade of the propeller on the upstream side is of a balanced load type, with a load more distributed in the axial direction than in the suction side pressure distribution of the blade on the downstream side, and with a load being smaller on an inner side in a radial direction.

5. The fluid machine according to claim 1, wherein
the propeller includes an inner circumference ring fitted into an outer circumference side of the shaft portion across a clearance, and
the fluid machine further includes:
a thrust bearing fixed to the shaft portion and facing the upstream side of the inner circumference ring entirely over a circumferential direction; and
a strut supporting the shroud relative to the shaft portion.

6. The fluid machine according to claim 1, wherein
the coupling portion has a convex curved shape protruding from an outside surface of the shroud, and
a cross-sectional shape along the outside surface of the shroud is of a blade form with the upstream side being a leading edge and the downstream side being a trailing edge.

7. A fluid machine comprising:
a shaft portion extending in an axial direction;
a shroud provided to surround the shaft portion and having a diameter decreasing from an upstream side on one side in the axial direction toward a downstream side on another side in the axial direction, a flow path being formed between the shroud and the shaft portion and having a flow path cross-sectional area decreasing toward the downstream side;

a propeller rotatably provided about an axis between the shaft portion and the shroud and configured to pump a fluid from the upstream side toward the downstream side; and a motor provided to correspond to the propeller, the motor including a rotor having a ring shape and being fixed to an outer circumference portion of the propeller and accommodated in the shroud, and a stator having a ring shape surrounding the rotor and being fixed in the shroud, wherein the motor is a conical motor in which diameters of the rotor and the stator decrease from the upstream side toward the downstream side, the stator of the conical motor includes:

a stator core including a back yoke forming an annular shape around the axis and having a diameter decreasing toward the downstream side, and a plurality of teeth protruding from an inside surface of the back yoke to an inner side in a radial direction, extending in a circumferential direction entirely over the axial direction, and having a thickness in the circumferential direction decreasing, with a diameter decreasing, toward the downstream side; and a plurality of coils provided to surround an outer surface of each of the teeth.

8. The fluid machine according to claim 7, wherein each of the coils includes a rectangular copper wire having a flat shape with a plurality of layers stacked in the radial direction around the teeth, and each layer of the coil has a rectangular shape with a distance in the circumferential direction decreasing toward the downstream side, as viewed in the radial direction.

9. The fluid machine according to claim 8, wherein each layer of the coil is inclined to the inner side in the radial direction toward the downstream side.

10. The fluid machine according to claim 9, wherein axial direction positions of end portions of coil ends of each coil in the axial direction match each other in each layer.

11. The fluid machine according to claim 10, wherein a portion of each layer of the coil forming the coil end is bent to be in parallel with the axis.

12. A fluid machine comprising:
a shaft portion extending in an axial direction;
a shroud provided to surround the shaft portion and having a diameter decreasing from an upstream side on one side in the axial direction toward a downstream side on another side in the axial direction, a flow path being formed between the shroud and the shaft portion and having a flow path cross-sectional area decreasing toward the downstream side;

a propeller rotatably provided about an axis between the shaft portion and the shroud and configured to pump a fluid from the upstream side toward the downstream side; and a motor provided to correspond to the propeller, the motor including a rotor having a ring shape and being fixed to an outer circumference portion of the propeller and accommodated in the shroud, and a stator having a ring shape surrounding the rotor and being fixed in the shroud, wherein the motor is a conical motor in which diameters of the rotor and the stator decrease from the upstream side toward the downstream side, the rotor of the conical motor includes:

a rotor core forming an annular shape around the axis and having a diameter decreasing toward the downstream side; and a plurality of permanent magnets provided at an interval from the rotor core in a circumferential direction and extending entirely over the axial direction, and the permanent magnets extend to be inclined to an inner side in a radial direction toward the downstream side and have a width in the circumferential direction decreasing toward the downstream side.

13. The fluid machine according to claim 12, wherein a magnetization direction of the permanent magnets is orthogonal to an outside surface of the rotor.

14. The fluid machine according to claim 12, wherein
the propeller further includes an outer circumference ring having a ring shape forming the outer circumference portion of the propeller, the rotor core is fitted to an outside surface of the outer circumference ring, and the fluid machine further includes:
a holding plate that is in contact with end portions of the outer circumference ring and the rotor core on the downstream side; and a holding bolt provided through the holding plate in the axial direction and fixing the holding plate to the outer circumference ring.

15. The fluid machine according to claim 14, wherein
the outer circumference ring has a thickness in the radial direction decreasing toward the downstream side, and a notched portion is formed in a portion between adjacent ones of the permanent magnets at an end portion of the rotor core on the downstream side, the notched portion receiving a part of an outside surface of the holding bolt inserted into the holding plate.

16. An underwater vehicle comprising:
a vehicle body; and
a propulsion apparatus provided to the vehicle body, wherein
the propulsion apparatus is the fluid machine described in claim 1.

* * * * *